United States Patent
Livingston et al.

(10) Patent No.: US 6,892,677 B1
(45) Date of Patent: May 17, 2005

(54) METHOD, APPARATUS AND SYSTEM FOR FILLING CHICKEN CAGES

(75) Inventors: Bernard Livingston, Nacogdoches, TX (US); John Holladay, Winterville, GA (US)

(73) Assignee: Bright Coop Co., Nacogdoches, TX (US)

( * ) Notice: Subject to any disclaimer, the term of this patent is extended or adjusted under 35 U.S.C. 154(b) by 0 days.

(21) Appl. No.: 10/132,094

(22) Filed: Apr. 24, 2002

Related U.S. Application Data

(63) Continuation-in-part of application No. 09/931,516, filed on Aug. 16, 2001, now Pat. No. 6,612,918.
(60) Provisional application No. 60/225,680, filed on Aug. 16, 2000.

(51) Int. Cl.[7] .............................................. A01K 29/00
(52) U.S. Cl. ....................................................... 119/845
(58) Field of Search ............................ 452/53; 119/713, 119/840–849

(56) References Cited

U.S. PATENT DOCUMENTS

| | | | | |
|---|---|---|---|---|
| 4,037,565 A | * | 7/1977 | Ledwell, Jr. ................ | 119/846 |
| 4,112,872 A | * | 9/1978 | Van Huis .................... | 119/455 |
| 4,600,351 A | * | 7/1986 | Nelson ........................ | 119/846 |
| 4,766,850 A | * | 8/1988 | O'Neill ....................... | 119/846 |
| 5,385,117 A | * | 1/1995 | Hollis et al. ................ | 119/846 |
| 5,660,147 A | * | 8/1997 | Wills et al. ................. | 119/846 |
| 5,669,755 A | * | 9/1997 | Zahn ....................... | 414/790.1 |
| 5,673,649 A | * | 10/1997 | Duecker et al. ............ | 119/337 |
| 5,706,765 A | * | 1/1998 | Horton ........................ | 119/846 |
| 5,735,664 A | * | 4/1998 | Jerome ........................ | 414/393 |
| 5,743,217 A | * | 4/1998 | Jerome ........................ | 119/846 |
| 5,983,837 A | * | 11/1999 | Briggs et al. ................ | 119/845 |
| 6,048,157 A | * | 4/2000 | Jerome ........................ | 414/393 |
| 6,109,215 A | * | 8/2000 | Jerome ........................ | 119/843 |
| 6,477,987 B2 | * | 11/2002 | Taylor ........................ | 119/843 |
| 6,564,752 B2 | * | 5/2003 | Jerome ........................ | 119/845 |

* cited by examiner

Primary Examiner—Thomas Price
(74) Attorney, Agent, or Firm—Robert E. Wise

(57) ABSTRACT

This invention is a system and involved components for staging a series of multi-compartmented, multi-tier chicken cages and loading them in a chicken house for with a chickens loader that receives chickens urged by a revolving gathering head onto a first longitudinal conveyor belt sloped upwardly to a second longitudinal conveyor belt assembly the distal end of which is vertically and horizontally positional form pivot positions at the proximal end thereof. A third conveyor system is longitudinally aligned and slideably mounted on the second conveyor assembly for extension and retraction. The belts of the three belt conveyors are operated to increase the speed of the chickens on the belts to a terminal speed in the range of from about 500 to about 1400 feet per minute, for discharge of the chickens into a facing open compartment of the chicken cage at that terminal speed. Cages are presented for this high speed loading on a platform having a front end and a longitudinal centerline, such that the cage doors face in a selected direction towards or away from said centerline when an empty cage is on a rear portion of the platform on one side of said centerline, face the front end of the platform transversely to the centerline at a front portion of the platform for loading with poultry, and face in the same selected direction towards or away from the centerline at a rear portion of the platform on a side of the centerline opposite from said one side for removal of a loaded cage from said platform.

26 Claims, 14 Drawing Sheets

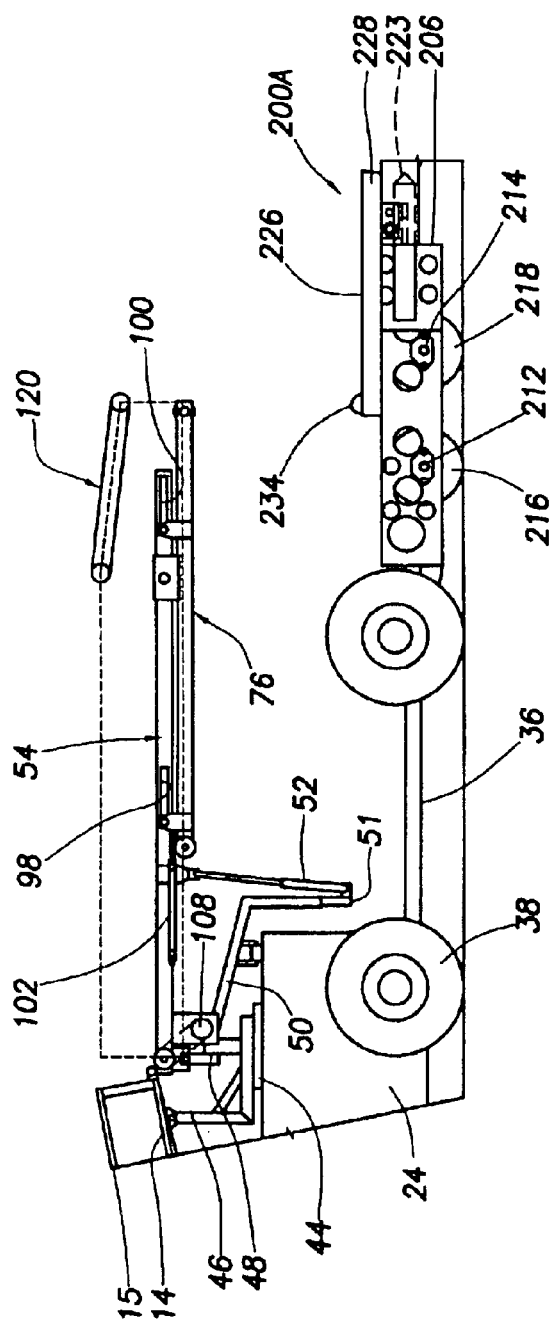
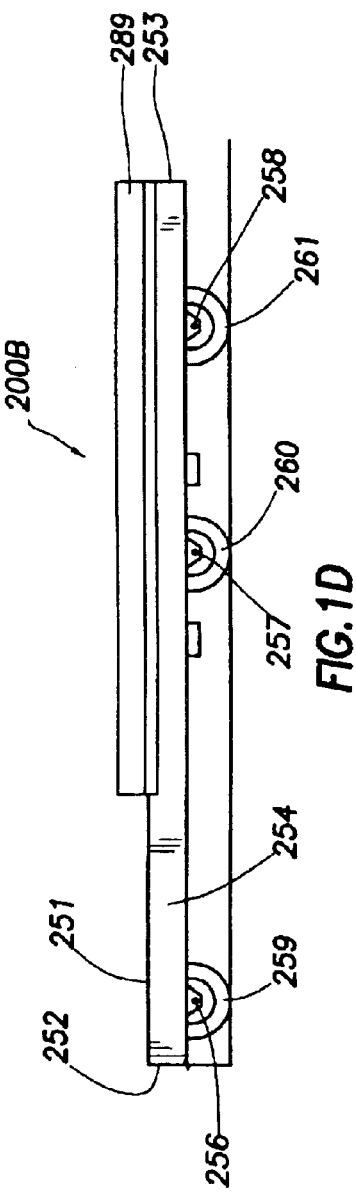
FIG.1C
FIG.1D

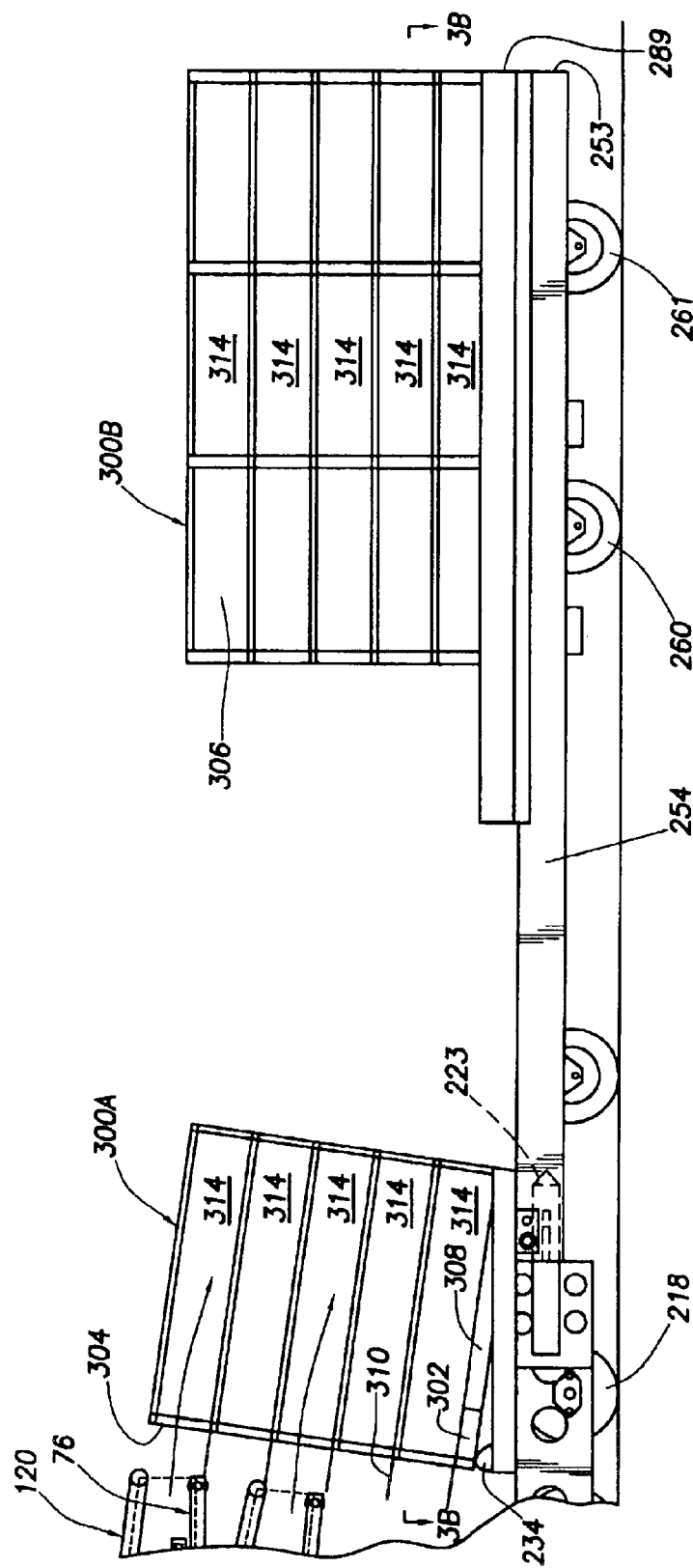

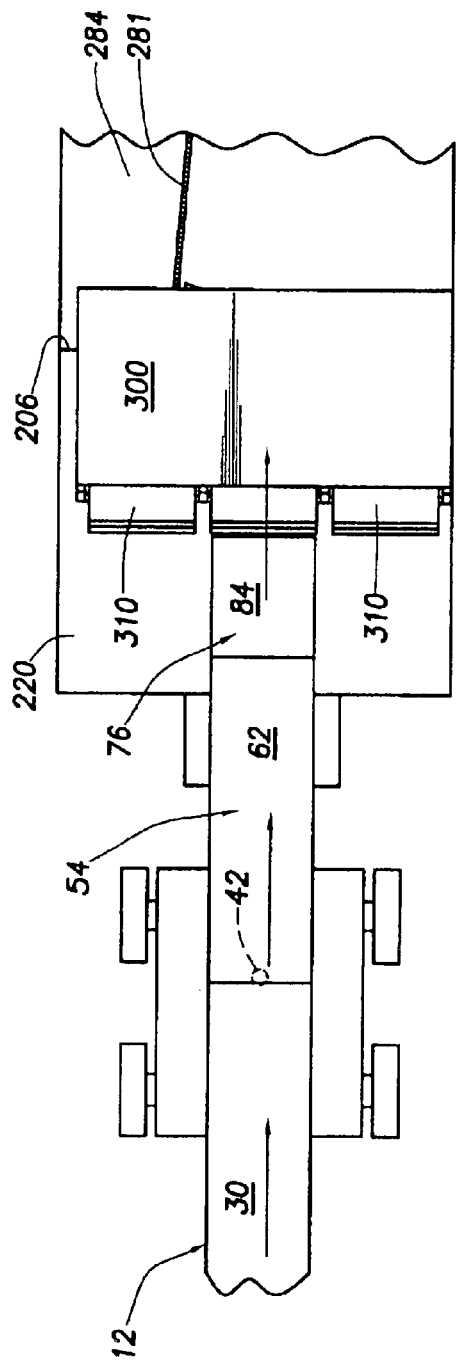
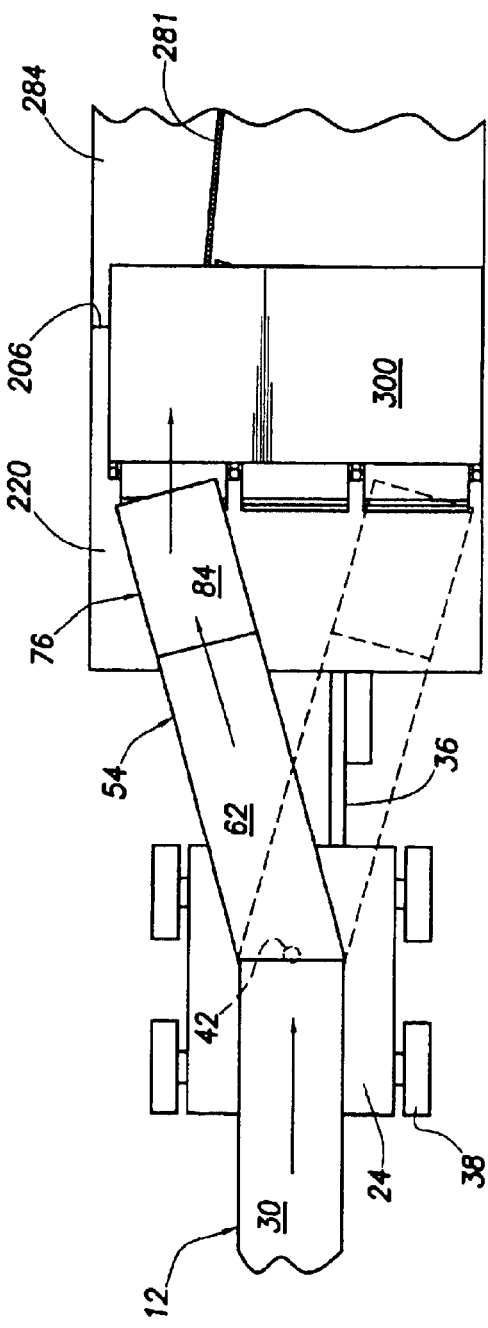

METHOD, APPARATUS AND SYSTEM FOR FILLING CHICKEN CAGES

CROSS REFERENCE TO RELATED APPLICATION

The present application is a continuation-in-part of U.S. patent application Ser. No. 09/931,516, filed Aug. 16, 2001, now U.S. Pat. No. 6,612,918 entitled "Poultry Cage Staging and Filling Method and Apparatus," which claimed the benefit of 35 U.S.C. §111(b) Provisional Application Ser. No. 60/225,680, filed Aug. 16, 2000, entitled "Apparatus and Method for Positioning Poultry Cages for Filling and Removal."

BACKGROUND OF THE INVENTION

This invention relates to methods, apparatii and systems for caging chickens caught at a growing site for live haul transport to processing plants where they are slaughtered and dressed for market.

The poultry industry today in the United States and in other countries provides a huge amount of the country's consumable protein, centered on chickens and turkeys. Poultry are raised from chicks to eating size free roaming in a structure called a "house", a "chicken house" in the case of chickens. Eating size is typically a five to six pound live weight for a "broiler" chicken destined for broiling, frying, grilling, or the like, heavier for chickens for stewing and the like, and often in the forty to fifty pound range for turkeys. When a poultry have reached eating size, they are caught, caged and hauled to a poultry processing plant where they are slaughtered and dressed for market. The part of the poultry industry that is responsible for catching, caging and hauling the poultry to a poultry processing plant is called the "live-haul" industry. The term "poultry" or "bird" are used interchangeably and generically refer to chickens, turkeys or other fowl raised for consumption. The present invention is directed to chickens as opposed to turkeys, which are too large and heavy for the present invention.

A typical modern chicken processing plant receives; slaughters and dresses from 50,000 to 300,000 chickens per day, and a few as many as 500,000 to 700,000 per day. The processing plant must have caged chickens at the plant ready to be unloaded and slaughtered in order to maintain a continuous operation. The live-haul operators are charged with this responsibility. The live-haul process has to be done efficiently and expeditiously in order both to keep the bird numbers flowing to the processing plant and to minimize bird death from holding the chickens too long in cages where massed body heat of the caged chickens causes them to dehydrate without chance of rewatering (especially in hot weather months).

The high daily throughput requirements of modern chickens processing plants in the United States has led to the development of improvements designed to facilitate rapid loading and unloading of caught chickens. Before these improvements were developed, caught chickens were deposited into wooden or plastic single compartment coops that opened at the top accessible from a closeable hatch. Coops were individually man-handled onto flatbed trailers and stacked in side-by-side columns to form rows of stacks that were then lashed to the trailer for transport to the processing plant. At the processing plant, these single compartment coops caused a bottleneck, because the chickens had to be withdrawn by hand. As processing plant slaughter line numbers and speed increased to meet growing sales demands, this bottleneck needed to be overcome, and in consequence, the modern steel chicken cage was developed and is universally used in today's high volume processing plants.

This cage is a multi-tied, multi-compartmented structure having over-the-center, spring loaded doors at the front of each compartment. The doors facilitate not only loading but unloading. At the processing plant the cage is tilted forward (towards the doors) causing the weight of the caged chickens to press against the doors until the spring load is overcome, snapping open the doors and allowed all the chickens in the cage to be dumped from the cage compartments onto wide conveyor collector belts leading to slaughter lines.

The modern steel chicken cage, now a design standard in the United States, is of a size that fits an over-the-road flatbed trailer, which is restricted in width to about eight feet for travel on public roads. Such cages for chickens have tiers of side-by-side compartments (a row). Each compartment is directly over a under another compartment in a different tier, providing a column of vertically superimposed compartments. Each compartment has a solid fiberglass floor and a front opening, bottom hinged, over-the-center spring loaded solid door that closes a portal or front opening to the compartment. The cage tiers number four, five or six, and have two or three compartments per tier. In a cage having three compartments per tier (called a "three door" cage), the individual compartments run about four feet deep, are about a foot high, and are about 29 inches wide (side to side). In a "two door cage", the compartments are about 45 inches wide. The compartment width sets the length of the cage, about eight feet, since the length is essentially a combination of compartment widths. Compartment depth sets cage depth. Thus a cage is about eight feet long and four feet deep. A typical compartment holds about 17–20 chickens of five to six pounds for a load of about 100 pounds of chickens per compartment. A five tier "three door" cage (15 compartments) carries about up to about 260–300 chickens at a total of about 1500 pounds of chicken per cage.

Weighing in at 1400 pounds of chickens when filled, the chicken cages are provided with fork tubes built into them along the length of the cage to allow the entire cage to be lifted with a forklift. Fork spread of forklift trucks and cage rigidity mandate that the fork tube pair incorporated into the cage structure run along the length of the cage at the front and rear base of the cage, putting the tubes about four feet apart corresponding to cage depth. Cross members tie together the fork tubes.

A typical live haul crew has chicken catchers, a forklift truck driver and a truck driver for each truck towing a flatbed trailer loaded with cages. Operations using the chicken cages start at the processing plant where empty cages are placed with forklift trucks on flatbed trailers with the length of the cage running across the width of the trailer, the single orientation permitted by the run of the fork tubes where the only approach available to the forklift to load the length of the trailer is from the side. Cages are loaded side by side the length of the trailer, then another row of cages is stacked and lashed atop the bottom row.

A forklift truck accompanies the cages to the chicken house farm where grown chickens ready for slaughter are to be caught in the house and are caged for transport to the processing plant. At the farm, the driver of the forklift truck has certain logistical factors to observe, both in unloading and delivering empty cages to a catching crew, and in fetching filled cages and loading the filled cages on a flatbed trailer for transport to the processing plant. When loading filled cages onto the transport trailer, good practice is to place the cages on the trailer with the cage doors facing all one way, preferably to the front where the doors face the wind, for better efficiency in unloading the cages at the processing plant for dumping. If the forklift driver picks up a filled cage with the doors to the driver's right, in order to place the doors to the front of the trailer, the driver must approach the trailer from the right side of the trailer (viewed from the rear of the trailer to the front). If the forklift driver picks up a filled cage with the doors to the left, in order to place the doors to the front of the trailer, the driver must approach the trailer from the left side of the trailer.

At the chicken house farm, the forklift truck perpendicularly approaches the trailer carrying empty cages (now unlashed), spears a cage with the forks inserted into the cage fork tubes, lifts and removes the cage, and carries it into the chicken house. Inside, the forklift takes the cage to a working area and elevates one fork higher than the other to tilt the cage from rear to front (front higher than the back). A worker places a prop under the cage to fix the tilt, the forks are withdrawn, and a worker opens the cage doors. Chicken catchers grab chickens by the legs, several at a time, and push them into the tilted cage through the open front. The inserted chickens instinctively want to right themselves immediately and move up to the opening of the compartment to escape. The solid and comparatively smooth plastic surface of the compartment floor is a new phenomenon to chickens raised on a rough litter surface, and the chickens have a more difficult time gaining purchase of it with their clawed feet. This difficulty combined with tilt of the smooth floor makes it harder for the self righting chickens to immediately scramble from the cage compartment. (As more birds are loaded in the tilted up cage, the birds gravitate to the back and load more weight to the rear than the front. If the cage is too steeply tilted, the cage will tip over backwards during loading. Experience has shown that a safe cage tilt angle is in the range of from about 11 to about 16 degrees from horizontal.)

During the time a cage is being filled, the forklift truck returns to the trailer, fetches another empty cage, brings it to the work area, tilts it by raising one fork more than the other, allows a crew member to prop it at the desired angle, withdraws the forks, and drives to the now filled cage, approaching it from a side that will position the cage doors to the left or right of the driver, whichever is the correct orientation for placing the cage on the trailer with the doors to the front of the trailer. The filled cage is forked from the proper side with the forks positioned one side higher than the other to fit the tubes at their relative elevation for the angle at which the cage is propped up. The cage is then lifted, the forks are adjusted to equal elevation thereby to level the cage, and the cage is carried out of the chicken house to the trailer upon which it is placed in proper orientation.

The speed with which the tilted cage is filled by the workers and the speed with which the tilted filled cage is retrieved and leveled by the forklift is important. The first chickens loaded in the compartment of the tilted cage are impressed by the weight of the later loaded chickens, which are "up-slope" to them in that compartment with the door closed. This "burying" of the chickens in the rear of a compartment continues so long as other compartments are being loaded and until the filled and tilted cage is retrieved and leveled by the forklift. If too long a time is taken to load the cage for retrievel or for the fork lift to pick up and level a cage already loaded, chickens at the rear of the cage risk smothering.

Modern poultry science permits raising about one chicken per 0.6 square foot of area. U.S. chicken houses typically are single story, about 40 feet wide, and from 300 feet long (12,000 square feet) to 500 feet long (20,000 square feet). A typical chicken house of from 12,000 to 20,000 sq. ft. may contain from about 20,000 to 33,000 chickens. Loading a three door five tier cage of 15 compartments each with about 20 five pound chickens (about 300 per cage), means that catching a 20,000 bird house requires about 66 cages (about three trailers) and a 30,000 bird house needs about 100 cages (about four trailers). A catcher typically catches several chickens in each hand and lifts them into an open cage compartment in the loading process. At a nominal five pounds per bird and two or three chickens per hand, each lift deposits up to 15 pounds, sometimes more, until all the chickens are caught and loaded. With nine catchers in a typical crew catching a 20,000 bird house, each catcher cages 5½ to 6 tons of chickens.

The physically demanding nature of chicken catching, the hugely increasing volume of chickens being processed for consumption, and a shrinking labor pool for this kind of work in the United States has lead to efforts to automate and mechanize the catching and cooping process. These efforts, indeed, are international, with efforts in different countries focusing on the particular life haul problems found in those countries. In Europe, chicken raising and consumption has not advanced to the huge scale in the United States, and perhaps for that reason the front-doored steel cage construction in wide use in the United States has not been universally adapted there; instead mechanization there has developed for loading and handling plastic trays or drawers largely of open top construction.

Examples of U.S. Patents and granted to European inventors and directed to catching and/or caging chickens in open top containers include:

TABLE 1

| 4,669,423 | Open top trays | Netherlands |
| 4,669,423 | Open top trays | Netherlands |
| 4,736,710 | Open top trays | Netherlands |
| 5,470,194 | Side opening drawers | Netherlands |
| 5,975,029 | Open top trays | Netherlands |
| 4,365,591 | Open top drawers | U.K. |
| 4,766,850 | Side-opening cage | U.K. |
| 5,660,147 | Open top drawers | U.K. |
| 5,699,755 | Open top drawers | U.K. |

Generally, efforts to mechanize the chicken catching and caging process have fallen into either the catching process alone or that process combined with a process for cooping chickens after capture. There have been numerous designs.

Examples of patents granted for inventions for the bird catching methods or apparatus only include the following (all to European inventors):

TABLE 2

| 4,508,062 | Berry et al. | U.K. |
| 4,513,689 | Berry et al. | U.K. |
| 4,900,292 | Berry et al. | U.K. |
| 5,259,811 | Berry et al. | U.K. |
| 5,361,727 | Berry et al. | U.K. |
| 5,863,174 | Mola | Italy |

Examples of patents granted for inventions for catching and cooping or just cooping captured poultry (specifically turkey in one particular case) are the following:

TABLE 3

| | | |
|---|---|---|
| 3,921,588 | Ledwell et al. | U.S. |
| 4,037,565 | Ledwell et al. | U.S. |
| 4,467,745 | Ledwell et al. | U.S. |
| 4,301,769 | Mola | Italy |
| 4,600,351 | Nelson | U.S. |
| 5,325,820 | Briggs et al. | U.S. |
| 5,385,117 | Hollis et al. | U.S. |
| 5,592,902 | Horton | U.S. |
| 5,706,765 | Horton | U.S. |
| 5,743,217 | Jerome | U.S. |

Among the patents listed in Table 3 are examples showing different approaches to staging coop frames or cages for serial loading of successive such coop frames or cages. Other patents directed only to staging successive frames or cages for loading include U.S. Pat. Nos. 5,476,353 to Mola and 5,791,854 to Cattaruzzi.

The foregoing designs have found only limited acceptance in the live haul industry, and the industry continues to demand a viable solution. Important considerations for a mechanized chicken cager include that it has to be transported on public roads to the chickens farm. At the chicken house, it should be able to enter the house and work there within width and height limitations imposed by frame of the house. Grower houses in the United States are not uniform in configuration. Some have a center post narrowing the span within which the equipment can travel. House end door heights and widths can be a limiting factor. Rafter heights range are normally about eight feet or more in the more modern houses in the Georgia, Arkansas, Texas and other southern chicken raising states. During the catching process, chicken feeder troughs and watering troughs typically are drawn up to the rafters to get them out of the way. This effectively reduces the overhead clearance for catching and caging equipment.

A mechanized chickens catching and caging operation that is to be usefully engaged in the United States must work with the modern steel chicken cages now standard in the United States, and must be supported by a constant supply of empty cages for filling, and at the same time, removal of cages already filled. A mechanized chicken cager should allow for maneuverability of cooperating forklift trucks which must bring it empty cages and remove filled cages. It should facilitate rapid cage filling and should be easy and simple to operate in order to maximize the skill levels of the labor pool who will be available to operate it. Machinery for providing a constant supply and removal of cages in addition should be narrow enough to be towed both over public roads and, necessarily, in chicken houses where the mechanized catching and loading operations must be supported. Further, it should integrate with the logistics for forklift operations at the farm site that are described above, allowing forklift placement and removal of cages in proper orientation for correct loading on a flatbed transport trailer.

U.S. Pat. Nos. 5,660,147 and 5,699,755, cited in Table 1 above, described one method for handling coops in connection with catching and loading chickens, using a towed working trailer in which a rectangular cage frame is longitudinally placed on the right rear of the trailer, advanced and turned to the front of the trailer for filling, and returned longitudinally to the left rear for removal. The cage frames have open top slidable drawer coops. The coop drawers are slidable in and out from either side of the cage frame, so there is no actual front or rear to the frame and coops. Thus it is unimportant whether the right side or left side of the cage frame is placed longitudinally on the towed working trailer, advanced to the front, and returned to the rear. This cage cycling system does not work for a steel cages with front loading doors such as used in the United States where the orientation of the front loading doors must be taken into account. If the system described in these patents were used with a steel cage having front opening doors, it would be necessary to deposit the cage on the described right rear loading location with the doors oriented to the right side of the trailer in order to turn the doors to face the front, as indicated in these patents, for cage filling. This would result in the cage being returned to the rear offloading position with the doors oriented to the left side of the working trailer. Thus a forklift driver would be constrained to unload the front doored cages from the right side of the transport trailer and to load the filled cages onto the left side of the trailer. This is unsuitable for a general purpose device.

Some of the above cited patents describe mechanisms for staging and filing steel chicken cages having front opening doors, namely, U.S. Pat. Nos. 5,325,820, 5,592,902 and 5,706,765. U.S. Pat. No. 5,325,820, using a side filling process, places two cages on opposite sides of a conveyor aisle such that viewed from the rear of the apparatus, the cage on the left of the aisle has its doors on the right, and the cage on the right of the aisle has its doors on the left. Placement of the cages onto and removal of the cage from this apparatus requires forklift access to both sides of a transport trailer and is accordingly unsuitable for general use. U.S. Pat. No. 5,592,902, using a front filling process, places and removes a front doored cage with the doors to the same side, but cannot stage a second empty cage until after a first empty cage is filled and returned to an off loading position. U.S. Pat. No. 5,706,765, using another side filling process, places and removes a front doored cage with the doors to the same side, but the manner of staging of the cages is unsuitable for front filling, because it requires a forklift to approach the staging platform from the side for offloading a filled cage while one is placed in filling position, thus the staging platform would have to be at least twice as wide as the cage length. Since these cages typically run 8 feet long, the platform would be at least 16 feet wide, too wide for towing over public highways and too wide for a working trailer in many chicken houses. U.S. Pat. Nos. 5,476,353 to Mola and 5,791,854 to Cattaruzzi are based on a carousel concept.

In general, forklift maneuverability for side access to a staging platform is limited in chicken houses; most permit only forklift access longitudinally in the house, and since the catching and caging operations longitudinally precede the cage deposit and retrieval operations in the chicken house, forklift access is usually constrained to an approach from the rear, not the side.

Among the purposes of this invention is to provide a working platform, preferably a towable working trailer, useful in connection with mechanized chickens catching and front loading equipment that will allow front opening steel chicken cages to be deposited onto the rear of the working trailer with the doors facing one side of the trailer, will reposition the cage to the front of the trailer for front loading, and will return the loaded cage to the rear for offloading with the doors oriented in the same direction as when originally placed on the working conveyor. Further a purpose is to obtain the forgoing, while simultaneously allowing deposit of an empty cage as one cage is filling, with positioning of that empty cage for filling while the filled cage is repositioned for offloading. Still further, it is an objective to accomplish all this yet still permit the working trailer to be trailered over public roads and towed in chicken houses.

These and other benefits are given by the present invention.

SUMMARY OF THE INVENTION

This invention comprises methods and structure in a system for continuously receiving and loading chickens into front-doored, multi-compartmented, multi-tiered chicken cages that are serially and continuously presented (staged) for loading. The invention includes individual major components and combinations of the major components in the cooperating system. The components comprise a novel chicken loader and a novel cage stager. The chicken loader includes conveyor belt means serially and generally longitudinally arranged for conveying the chickens from adjacent ground level to a higher elevation at belt speeds increasing to a terminal speed in the range of 500 to 1400 feet per minute, and means for aligning a chicken discharge end of said conveyor belt means with an open facing compartment in said cage for discharge of said chickens directly into said compartment at said terminal speed. The stager moves empty cages into position for receipt of the chickens, employing novel staging platforms which receive empty cages with their doors facing in one direction (say, to the right as the platform is viewed from the rear), and after the cages are loaded with the chickens, moves the cages to another position on the platform for removal with the doors still oriented in the original direction (to the right, in this example). This facilitates efficiency in fetching empty cages from a trailer for loading with chickens and picking up loaded cages for placement on a trailer for transport to a processing plate.

In general, the method of the invention is one of loading chickens inside a chicken house into a chicken cage having a plurality of compartments, and comprises receiving and conveying the chickens from ground level on a longitudinally revolving continuous belt to a higher elevation, transferring the chickens to one or more serially and generally longitudinally arranged revolving continuous belts including a terminal belt, operating said belts to increase the speed of the chickens on the belts to a terminal speed in the range of 500 to 1400 feet per minute, and discharging the chickens at said terminal speed from a distal end of said terminal belt directly into a facing open compartment in the cage.

High loading speed is important in realizing the advantages of the loading method and apparatus of the invention. As explained in the "Background of the Invention", when birds are manually placed through a doorway into a cage compartment, they ordinarily immediately try to resist going towards the back of the compartment and seek to escape out the doorway. If a train of birds is being attempted loaded by a conveyor belt into the compartment at less than a high loading speed, the lead birds of the train aren't propelled all the way to the back of the compartment and seek their escape going counter flow to birds entering the compartment behind them in the train coming off the conveyor. This tends to impede the flow of the birds trailing them into the compartment, clustering or bunching incoming birds toward the front portion of the compartment, slowing completion of delivery of the last of the birds in the train into the compartment and sometimes allowing some of the birds to escape. If the birds aren't loaded fast enough, the loader becomes a choke point to the catching and loading process, slowing the entire process of catching and caging birds.

We have discovered that, for a loading conveyor in loading alignment with the facing opening of a cage compartment, chickens are efficiently loaded into a cage compartment in a manner alleviating bunching at the front portion of the compartment if the loading conveyor is operated at a speed sufficiently fast to propel the lead chickens being loaded into a cage compartment all the way to the back of the compartment (with the remainder of the chickens loaded just as fast as the lead chickens).

We have found that a terminal or cage loader conveyor belt speed of at least about 100 feet per minute per pound of bird is about the minimum high loading speed that is effective for efficiently loading broiler weight chickens, in most instances, if the cage is tilted up with compartment floors down sloping (as is typical for manual loading). The expression "per pound of bird" or "per pound of chickens" refers to an average weight of birds being loaded. Preferably the high loading speed is more in the vicinity of about 150–200 feet per minute per pound of bird. Thus, for a nominal broiler weight chicken in the range of about five to about seven pounds, loader belt speed should be at least about 500 feet per minute up to at least about 1050 feet per minute up to about 1400 feet per minute. We have found that a belt speed of about 800 to 900 feet per minute, suitably about 850 feet per minute, is generally acceptable as a default or starting point for a high loading speed for the usual broiler weight bird, subject to adjustment as necessary in the particular situation. If the cage is not tilted up as is conventional, higher loader belt speeds may be appropriate because the birds seeking escape do not have gravity to overcome as they do with a down sloping floor. If the birds are wet, higher speeds may be needed more than if the birds are dry.

The lower limits of the high loading speed of the terminal or loader conveyor belt is a speed sufficient to propel chickens into a cage compartment on their feet, standing, crouching or squatting, propelling the lead bird all the way to the back of the compartment. The upper limit of the high loading speed is a terminal or loading conveyor belt floor speed beyond which the speed is so fast, relative to the speed of the chickens when they are received on the loading belt conveyor, that the chickens aren't able to stay upright, that is, the speed of the loading belt conveyor floor topples the chickens off their feet and puts them on their side or back. On their back or side, the lead chickens deposited at the back of the compartment, especially if the cage is tilted up for loading, aren't able to push off chickens that follow on top of them in mass and so aren't able right themselves. Uprighted, the lead chickens may smother under the mass of chickens on top of them in the time it takes to load the entire cage if the cage is tilted up for loading. Inevitably, some chickens will loose their feet even at minimum high loading speeds. When chickens are said to be propelled into the compartment on their feet, it is meant on the whole the speed is not so fast as consistently to topple the chickens in large proportions. Some losses due to toppling will be acceptable as a cost of faster loading efficiencies.

If the chickens are accelerated immediately from standstill or a slow speed to a high loading speed, the chickens may be toppled off their feet, depending on the weight of the chickens, the speed of the loading belt, slickness of the surface of the conveyor belt (they get dirty in use and sometimes wet) and perhaps other variables. In this invention by incrementally moving the batched chickens from standstill on the floor of the chicken house to a high loading speed, the chickens in general aren't toppled off their feet, as they are move likely to have happen if they are accelerated all at once to a high loading speed.

More particularly describing the methodology of loading the birds, the method comprises the operations of receiving the chickens on a first longitudinal conveyor belt sloping upwardly from adjacent ground level to an elevated end and conveying the chickens on the first conveyor belt at a belt speed in the range of about 100 to about 400 feet per minute, receiving the chickens from the elevated end of the first longitudinal conveyor belt on a second longitudinal belt and conveying the chickens on the second longitudinal belt at a belt speed faster than the belt speed of the first longitudinal conveyor belt and in the range of about 200 to about 600 feet per minute, receiving the chickens from a distal end of the second longitudinal belt onto a third longitudinal conveyor belt longitudinally aligned with an open facing compartment of the cage and rotating the belt at a belt speed faster than the belt speed of the second longitudinal conveyor belt and in the range of about 500 to about 1400 feet per minute to discharge the chickens from a distal end of such third conveyor belt directly into the facing compartment.

The standard chicken cage is multi-tiered, so in this respect the methodology further comprises relocating the terminal belt and discharging chickens into another facing open compartment in the cage, loading that cage until full and then relocating the terminal belt to face another open compartment, and so on, until all empty cage compartments are loaded with chickens.

The precedent operation to receiving the birds for loading is capturing chickens on the floor of the chicken house and ushering them onto the first longitudinal conveyor belt to a higher elevation. Broiler weight chickens in a growing house will run a spread of weights. The many variables involved do not admit of one set of lift and loader belt speeds. In practice, we have observed, that for a terminal loading belt speed of about 800 to 900 feet per minute for broiler weight chickens, a second longitudinal conveyor belt speed of about 300 to 400 feet per minute adequately matches up with a lift or first longitudinal conveyor belt speed of about 200–300 feet per minute.

This invention provides means for accomplishing the functions described above that are part of the methodology of this invention for catching, lifting, and loading chickens into front-doored, multi-compartment chicken cages.

The conveyor belt means for loading chickens inside a chicken house into a chicken cage having a plurality of compartments comprise a) a first longitudinal conveyor belt assembly comprising a frame, rollers and belt, the assembly sloping upwardly from adjacent ground level to an elevated end, and at least one driver operatively associated with at least one roller of the first longitudinal conveyor assembly for driving the belt thereof toward the elevated end at a first belt speed in the range of about 100 to about 400 feet per minute, b) a second longitudinal conveyor belt assembly comprising a frame, rollers and belt, the assembly having a proximal end and distal end, for receiving on the proximal end, from the elevated end of the first longitudinal conveyor belt, chickens moving essentially at the first belt speed, and at least one driver operatively associated with at least one the roller of the second longitudinal conveyor assembly for driving the belt of the second longitudinal conveyor assembly toward the distal end thereof at a second belt speed in the range of about 200 to about 600 feet per minute that is faster than the first belt speed, and c) a third longitudinal conveyor belt assembly comprising a frame, rollers and belt, the assembly having a proximal end and distal end, for receiving on the proximal end, from the distal end of the second longitudinal conveyor belt, chickens moving essentially at the second belt speed, and at least one driver operatively associated with at least one the roller of the third longitudinal conveyor assembly for driving the belt of the third longitudinal conveyor assembly toward the distal end thereof at a third belt speed in the range of 500 to about 1400 feet per minute that is faster than the second belt speed, for discharge of the chickens from the belt of the third longitudinal conveyor assembly directly into a longitudinally aligned open facing compartment of the cage. Advantageously, the third longitudinal conveyor belt assembly is mounted to the second longitudinal conveyor belt assembly to extend past the distal end of the second longitudinal conveyor belt assembly. Preferably, the third longitudinal conveyor belt assembly is slideably mounted to the second longitudinal conveyor belt assembly for extension and retraction of the distal end of the third longitudinal conveyor belt assembly relative to the distal end of the second longitudinal conveyor belt assembly.

Means for aligning a chicken discharge end of the conveyor belt means with an open facing compartment in the cage for discharge of the chickens directly into the compartment at the terminal speed include a) a first support for the frame of the second longitudinal conveyor assembly for rotation of the frame of the second longitudinal conveyor assembly about a vertical axis, b) a first prime mover for rotating the frame of the second longitudinal conveyor assembly about the vertical axis to move the distal end of the third longitudinal conveyor belt assembly through an arc centered on the vertical axis, c) a second support for the frame of the second longitudinal conveyor assembly for rotation of the frame of the second longitudinal conveyor assembly about a horizontal axis, and d) a second prime mover for rotating the frame of the second longitudinal conveyor assembly about the horizontal axis to raise and lower the distal end of the third longitudinal conveyor belt assembly about the horizontal axis.

An optional fourth conveyor assembly is employed to help prevent the chickens from tumbling or rolling on the third conveyor belt that loads the chickens directly into the facing open compartments of the chicken cage. The fourth conveyor assembly comprises a frame, rollers and belt, the assembly overlaying at least a distal portion of the third longitudinal conveyor belt assembly, and at least one driver operatively associated with at least one the roller of the fourth conveyor assembly for driving the belt of the fourth longitudinal conveyor assembly in the same direction as the belt of the third longitudinal conveyor belt assembly at a fourth belt speed in the range of 500 to about 1400 feet per minute substantially the same the third belt speed. The overhead conveyor belt essentially maintains the position of the birds on the third belt. If the birds are upright when they get on the third belt, the overhead belt will tend to keep them upright; conversely, if a bird is on its back, the overhead belt will tend to keep the bird on its back.

In this invention, the conveyor belts have a belt width to compartment width ratio of about 0.5. If the optional overhead belt is employed, it will preferably also have a belt width to compartment width ratio of about 0.5. In a three door cage, with a compartment width of 29 inches, the belt widths are about 16 inches, and with this width, speed ranges of the first, second and third conveyor belts suitable for broiler weight chickens are respectively about 200 to 400 feet per minute, about 300 to 600 feet per minute and about 500 to 1400 feet per minute, the second belt speed being higher than the first belt speed and the third or loader belt speed being higher than the second belt speed. A wider belt accommodates more chickens and slightly slower belt speeds may be used. In a two door cage, compartment widths are about 45 inches and the belt widths may be about 25 inches. The ranges of belt speeds of the first, second and third conveyor belts for a 25 inch wide belt are respectively about 100 to 300 feet per minute, about 250 to 550 feet per minute and about 500 to 1400 feet per minute.

As mentioned above, this invention involves a system not only for capturing and loading chickens into a front-doored multi-compartmented chicken cage in a chicken house, but also staging the cages for serial loading in a continuous operation. Thus the invention not only comprises (1) conveyor belt means serially and generally longitudinally arranged for conveying the chickens from adjacent ground level to a higher elevation at belt speeds increasing to a terminal speed in the range of 500 to 1400 feet per minute, and (2) means for aligning a chicken discharge end of the conveyor belt means with an open facing compartment in the cage for discharge of the chickens directly into the compartment at the terminal speed, but also, the system of the invention comprises (3) means for staging a series of empty the poultry cages on a platform having a front end and a longitudinal centerline, such that the cage doors face in a selected direction towards or away from the centerline when an empty cage is on a rear portion of the platform on one side of the centerline, face the front end of the platform transversely to the centerline at a front portion of the platform for loading with poultry, and face in the same selected direction towards or away from the centerline at a rear portion of the platform on a side of the centerline opposite from the one side for removal of a loaded cage from the platform.

The stager used in this system comprises a platform having a front, a rear, two sides each longer than the rear and a centerline. The centerline is an imaginary line running from the platform front to rear and marking the center between the sides of the platform. It does not require, but does not prevent, structure from being located there. There is a place of origin at a first rear portion of the platform to one side of the centerline, for receipt of a cage placed with the cage fork tubes longitudinal to the sides of the platform and the cage doors facing a selected first direction towards or away from the centerline. There is a place of destination at a second rear portion of the stager on the other side of the centerline, and there is a place of cage filling at the front of the platform between the sides. The stager includes means for moving an empty cage put on the platform from the place of origin finally to the place of destination with the doors of the cage remaining facing the same selected direction upon final arrival of the cage at the place of destination.

Thus viewing the stager from the rear at the centerline, if the place of origin is to the left of the centerline (putting the place of destination on the right of the centerline) and if a cage is deposited at the place of origin with the cage doors facing the centerline, then the cage doors would face to the right. In accordance with the present invention, when the cage arrives loaded at the place of destination, the cage doors will still face the right, away from the centerline. The reverse applies too. If the place of origin is to the right of the centerline and the place of destination is to the left of the centerline, and if the cage doors at the place of origin face the centerline, the doors (viewed from the rear of the stager) will be on the left of the viewer when the empty cage is deposited on the place of origin, and will be on the left of the viewer when the loaded cage arrives at the place of destination. Alternatively, with the place of origin to the left of the centerline, a cage deposited there with the cage doors facing away from the centerline (to the viewer's left) will arrive loaded in accordance with this invention at the place of destination with the cage doors facing the centerline (to the viewer's left). The viewer is, of course, the driver of the fork lift who places the cages on the place of origin and who removes the cages from the place of destination.

Thus, the stager of this invention, in its several forms, always returns loaded cages for removal with the doors facing in the same direction with respect to the driver as the doors faced when the driver deposited the cage on the stager at the place of origin. This reduces the number of operations the driver has to accomplish. The driver does not have to pick up a filled cage and take it to a location to set it down and drive to the other side of the cage and pick it up again and then drive to the trailer to load the filled cage on the trailer in the proper orientation. The driver needs only to fetch an empty cage from a trailer and return the filled cage to the trailer facing the same direction as the empty cage. This allows the driver to load the filled cage faster and so fetch another empty cage quicker for return to the stager and placement at the place of origin.

Between empty cage departure on the stager from the place of origin and final cage arrival loaded at the place of destination, means rotate the cage in substantially discrete two quarter turns such that at the place of filling, the cage doors face the front of the platform and after leaving the place of filling and upon reaching the place of destination, the cage doors face the original selected direction (the direction they faced when deposited at the place of origin.

Thus a staging methodology for staging front-doored multi-compartment cages having fork tubes along length of the cage, for frontal filling of the cages, comprises—on a platform having a front, a rear, two sides each longer than the rear a centerline, a place of origin at a first rear portion of the stager to one side of the centerline, a place of destination at a second rear portion of the stager on the other side of the centerline, and a place of cage filling at a front portion of the platform between the sides—the operations of placing an empty cage at the place of origin with the cage fork tubes longitudinal to the sides of the platform and the cage doors facing a selected direction toward or away from the centerline, moving the cage on the platform from the place of origin finally to the place of destination with the doors of the cage remaining facing the same selected direction upon arrival of the cage at the place of destination, and between departure from the place of origin and arrival at the place of destination, rotating the first cage in substantially two quarter turn increments such that at the place of filling, the cage doors face the front of the platform, and after leaving the place of filling and before reaching the place of destination, the cage doors of the filled cage face the selected direction.

In one embodiment, for example, the selected direction of the cage doors is facing away from the centerline. The cage is first moved directly from the place of origin to the place of destination, thence to the place of filling, and thence back to the place of destination, rotating the cage in the first quarter turn between the place of destination and the place of filling, and rotating the cage in the second quarter turn between the place of filling and the place of destination. In this embodiment, therefore, the method of use comprises—on a platform having a front, a rear, two sides each longer than the rear, a centerline, a place of origin at a first rear portion of the stager to one side of the centerline, a place of destination at a second rear portion of the stager on the other side of the centerline, and a place of cage filling at a front portion of the platform between the sides—placing the cage at the place of origin with the cage fork tubes longitudinal to the sides of the platform and the cage doors facing away from the centerline; thence moving the cage on the platform from the place of origin to the place of destination and thence to the place of filling, rotating the cage substantially a quarter turn after leaving the place of destination and by the time of arrival at the place of filling, such that at the place of filling, the cage doors face the front of the platform. After that the cage is moved on the platform from the place of filling to the place of destination, and the cage is rotated substantially a quarter turn such that on arrival at the place of destination, the cage doors face the same selected direction as when the cage was placed at the place of origin.

The forgoing sequence of operations applies whether the place of origin is on the right or left of the centerline (from the viewpoint of the fork lift driver).

Another embodiment of the staging operation of the system has the advantage of less cage movement on the platform. This allows more cages to be placed, filled and removed from the platform in a unit of time. This staging operation is one in which the selected direction of the cage doors of the empty cage is facing towards the centerline. The cage is moved directly from the place of origin to the place of filling, thence to the place of destination, rotating the cage a first quarter turn between the place of origin and the place of filling, and rotating the cage for a second quarter turn between the place of filling and the place of destination. In this latter operation—on a platform having a front, a rear, two sides each longer than the rear, a centerline, a place of origin at a first rear portion of the stager to one side of the centerline, a place of destination at a second rear portion of the stager on the other side of the centerline, and a place of cage filling at a front portion of the platform between the sides—the methodology is one of placing a first the cage at the place of origin with the cage fork tubes longitudinal to the sides of the platform and the cage doors facing towards the centerline; thence moving the first cage on the platform from the place of origin to the place of filling, rotating the cage substantially a quarter turn such that at the place of filling, the cage doors face the front of the platform; and thence moving the first cage on the platform from the place of filling to the place of destination, rotating the cage substantially a quarter turn such that on arrival at the place of destination, the cage doors face the same direction as when the cage was placed at the place of origin. The foregoing sequence of operations applies whether or not the place of origin is on the left or right of the centerline (from the viewpoint of the fork lift driver).

More particularly describing the latter more preferred embodiment in the form of a unitary platform in accordance with the invention for staging a front-doored compartment multi-compartmented chicken cage having fork tubes extending along the front and back of the cage at the base of the cage transverse to the direction of front door opening, the platform comprises a frame having (an imaginary) longitudinal centerline and longitudinally connected front and rear ends. The frame mounts transversely to the longitudinal centerline at least two wheel axles carrying wheels supporting the frame above ground level. A supporting surface is mounted on the frame. A tray is horizontally pivotally mounted to one side of the frame centerline in a front portion of the frame and is supported on the aforementioned supporting surface. The tray has a front end and a rear end and opposing sides and is pivotable, from a home position in which the sides of the tray are transverse to the frame centerline, to an away position in which the sides of the tray are substantially parallel with the frame centerline. The sides of the tray are in "in" side and an "out" side. The former is the side closer to the frame centerline than the latter side when the tray is in the away position.

Continuing with the description of this unitary platform embodiment, a first cage mover is supported by the frame in a rear portion of the frame on the same side of the centerline where the tray is in the away position. The first cage mover has a first engager for engaging a chicken cage placed on the rear portion with the cage fork tubes longitudinally aligned substantially parallel to the longitudinal centerline of the frame and the cage doors facing the centerline. The first cage mover also has a first force transmission drive for moving the engaged cage so aligned toward the front end of the frame and onto the tray in the away position. A pivot member is provided on the platform adjacent the frame centerline between the front and rear ends of such frame. A second cage mover is provided on the frame on the side of the centerline opposite the first cage mover. The second cage mover has a second engager for engaging the cage on the tray when the tray is in the home position, and has a second force transmission drive carrying the second engager for moving the engaged cage towards a rear portion of the frame on the opposite side of the centerline, in so doing turning the front end of the tray towards the away position and pivoting the back of the cage on the pivot member to align the cage with its fork tubes substantially parallel to the longitudinal centerline of the frame when the cage is at the rear portion of the frame on the opposite side, and with the cage doors facing away from the centerline.

This unitary platform embodiment of a cage stager may also and preferably but not necessarily will include an elevator attached to the frame adjacent the front end of the frame and elevatable above the support surface for tilting up the chicken cage to ready it for loading. The cages are normally tilted up rear to front at a minor acute angle. This will be an angle that is effective to make it more difficult for birds to escape from a compartment during loading (as has been conventional with manual loading) but not so steep as to risk the cage from falling backwards as birds are loaded in it and weight the cage to the rear of the cage. An angle in the range from about 11 to about 16 degrees to the horizontal is generally suitable for this purpose, although a lesser or greater angle may be used within the constraints of risking fall over. The elevator provides an elevation in this range that matches the slope of the base support of the cage loader so that uniform distance is provided between the discharge end of the cage loader and the receding edges of the doors at successively higher tiers of the cage, as explained above. The "in-side" of the platform tray has an opening or recess through which the elevator can elevate above the tray when the tray is in the home position. The "out-side" of the tray comprises an flange angled to substantially the same angle from horizontal as the cage is to be tilted up. This flange member provides a backstop to fix the back base of the cage on the tray and prevent it from sliding or skidding off the tray toward to the rear of the platform when the elevator tilts up the front of the cage to ready it for loading.

For over-the-road transport of the preferred stager mode (in which the cage doors of empty cages are placed on the stager facing in the direction of the stager centerline), it is preferred for reasons of convenience in compactly trailering the stager to the chicken house farm to employ a stager comprised of two parts combinable at the farm site. The two parts are leading chassis and a trailing chassis.

The leading chassis comprises a leading chassis frame having a longitudinal centerline and longitudinally connected front and rear ends. The leading chassis frame mounts transversely to the longitudinal centerline at least one wheel axle carrying wheels supporting the leading chassis frame above ground level. Aligning and connecting members are provided at the rear of the leading chassis frame for aligning and connecting the leading chassis to a trailing chassis. A rear platform is on the leading chassis frame rear. A tray is horizontally pivotally mounted and supported on the rear platform on one side of centerline. The tray has a front end and a rear end and has opposing sides and is pivotable from a home position in which the sides of the tray are transverse to the longitudinal centerline of the leading chassis frame, to an away position in which the sides of the tray are substantially parallel to the longitudinal centerline of the leading chassis frame.

The trailing chassis includes a trailing chassis frame having a longitudinal centerline and longitudinally connected front and rear ends. The front end has mating members for the aligning and connecting members for connecting the trailing chassis in longitudinal alignment with the leading chassis. The trailing chassis frame transversely mounts at least one axle for carrying wheels, the wheels supporting the trailing chassis frame above ground level substantially at the same elevation as the level of the leading chassis. A supporting surface is mounted on the trailing chassis frame. A first cage mover is supported by the trailing chassis frame in a rear portion of the trailing chassis on the same side of the trailing chassis centerline where the tray on the leading chassis is in the away position. The first cage mover has a first engager for engaging a chicken cage placed on the rear portion of the trailing chassis with the cage fork tubes longitudinally aligned substantially parallel to the trailing chassis centerline and the cage doors facing the centerline. A first force transmission movement carries the first engager for moving the engaged cage so aligned toward the front end of the trailing chassis and off the trailing chassis onto the tray in the away position on the leading chassis. A pivot member is located adjacent the trailing chassis centerline between the front and rear ends of the trailing chassis frame. A second cage mover is on the trailing chassis on the side of the trailing chassis centerline opposite the first cage mover. The second cage mover has a second cage engager for engaging the cage on the tray on the leading chassis frame when the tray is in the home position, and has a second force transmission movement carrying the second engager for moving the engaged cage towards a rear portion of the trailing chassis frame on the opposite side of the centerline, in so doing turning the front of the tray towards the away position and pivoting the back of the cage on the pivot member to align the cage with its fork tubes substantially parallel to the longitudinal centerline of the trailing chassis when the cage is at the rear portion of the trailing chassis frame on the opposite side, and with the doors facing away from the centerline.

This more conveniently transportable two chassis embodiment also may and preferably does have an elevator attached to the leading chassis frame adjacent the front end of such frame and elevatable above the rear platform, in the same manner and for the same purpose as in the unitary platform embodiment. And as in the unitary platform embodiment, the in-side of the tray (on the leading chassis) has an opening through which the elevator can elevate above the tray when the tray is in the home position, the out-side comprising an upstanding retainer member to provide the brace for the back base of the cage when it is tilted up.

Thus, a method is more particularly provided for staging a front-doored compartment multi-compartmented chicken cage having fork tubes extending along the front and back of the cage at the base of the cage transverse to the direction of front door opening. The method comprises (a) placing a first the cage on one side of a longitudinal frame centerline in a rear portion of a support surface fixed on a frame having longitudinally connected front and rear ends, with the cage fork tubes longitudinally aligned substantially parallel to the longitudinal centerline of the frame and the cage doors facing the centerline, (b) engaging the first cage placed on the rear portion and moving the engaged cage so aligned toward the front end of the frame and onto a tray in an away position of the tray, the tray being horizontally pivotally mounted on the same the one side of the centerline in a front portion of the frame and supported on the surface, the tray having a front end and a rear end and opposing sides and being pivotable from a home position in which the sides of the tray are transverse to the frame centerline, to the away position in which the sides of the tray are substantially parallel with the frame centerline, (c) moving the tray to the home position where the cage doors face the front of the frame, (d) engaging the first cage on the tray in the home position and moving the engaged cage in the direction of the rear of the frame on the opposite side of the centerline from the one side, in so doing turning the front of the tray towards the away position and pivoting the back of the cage on the pivot member to align the cage with its fork tubes substantially parallel to the longitudinal centerline of the frame when the cage is at the rear portion of the frame on the opposite side, and with the doors facing away from the centerline, and (e) removing the first cage from the support surface.

This method further comprises, after operation (b) with respect to the first cage, placing a second the cage on the one side of the longitudinal frame centerline in the rear portion, with the second cage fork tubes longitudinally aligned substantially parallel to the longitudinal centerline of the frame and the doors of the second cage facing the centerline and after commencing operation (d) with respect to the first cage, performing operations (b)–(d) on the second cage.

As is seen from the foregoing, there is provided, in accordance with this invention, a system for loading chickens into a series of front-doored multi-compartmented chicken cages. The system comprises (a) a plurality of chickens receiving bins arranged side by side, (b) means structurally associated with the bins for longitudinally removing chickens in one of the bins while not removing chickens from the others of the bins, (c) means longitudinally arranged relative to the removing means for receiving the removed chickens directly from the removing means and longitudinally discharging the removed chickens at a high loading speed into an open compartment of a transversely facing front-doored compartment of the chicken cage, and (d) means for staging a series of empty the chicken cages on a platform having a front end and a longitudinal centerline, such that the cage doors face in a selected direction towards or away from the centerline when an empty cage is on a rear portion of the platform on one side of the centerline, face the front end of the platform transversely to the centerline at a front portion of the platform for loading with chickens, and face in the same selected direction towards or away from the centerline at a rear portion of the platform on a side of the centerline opposite from the one side for removal of a loaded cage from the platform.

The system for loading chickens in a series of front-doored multi-compartmented chicken cages is based on a method of the invention that comprises (a) placing a first of a series of empty the chicken cages on a platform having a front end and a longitudinal centerline, initially such that the cage is on one side of the centerline with the cage doors facing the centerline, then (b) moving the cage to a front portion of the platform transversely to the centerline with the doors facing the front of the platform, (c) longitudinally delivering chickens at a high loading speed directly and serially into open compartments of the transversely front door facing chicken cage, (d) after the cage is loaded with chickens, moving the loaded cage on the platform to the opposite side of the centerline from where the empty cage was initially placed so that the doors of the cage face away from the centerline, (e) removing the first cage from the platform, (f) at anytime after operation "(b)", placing a second of the series of empty chicken cages on the platform, such that the second cage is on the one side of the centerline with the cage doors facing the centerline, and then (g) repeating steps "(b)"–"(e)" with respect to the second cage.

A different method applies where the stager is placed on a platform facing away from the centerline. In that case, the method of loading chickens in a series of front-doored multi-compartmented chicken cages, comprises (a) placing a first of a series of empty the chicken cages on a platform having a front end and a longitudinal centerline, initially such that the cage is on one side of the centerline with the cage doors facing away from the centerline; thence (b) moving the cage on the platform to the opposite side of the centerline from where the empty cage was initially placed so that the doors of the cage face away from the centerline; thence (c) moving the cage to a front portion of the platform rotating the cage a quarter turn such that the cage is transverse to the centerline and the doors face the front of the platform; (d) longitudinally delivering chickens at high loading speed directly and serially into open compartments of the facing chicken cage; (e) after the cage is loaded with chickens, moving the loaded cage on the platform to the opposite side of the centerline rotating the cage a quarter turn such that the doors of the cage face towards the centerline; (f) removing the first cage from the platform; (g) at anytime after operation "(b)", placing a second of the series of empty chicken cages on the platform, such that the second cage is on the one side of the centerline with the cage doors facing the away from the centerline; and then (h) repeating steps "(g)"–"(e)" with respect to the second cage.

These and other features of the invention will be seen from a detailed description of an embodiment of the invention and a description of an alternative staging apparatus and method for that embodiment.

DESCRIPTION OF THE DRAWINGS

FIG. 1C depicts in side view the elevated end of the first longitudinal conveyor assembly of FIGS. 1A and 1B, second and third longitudinal conveyor assemblies of this invention, and the leading chassis portion of a cage stager of the system portion of this invention.

FIG. 1D shows in side view the trailing chassis portion of a cage stager of the system portion of this invention.

FIG. 2 shows the leading chassis portion of FIG. 1C coupled to the trailing chassis portion of the cage stager seen in FIG. 1D, with chicken cages staged on the stager, one positioned at a position of place of origin and the other positioned at a place of filling.

FIG. 4A is a top diagrammatic view of the conveyors of this invention shown in positions for loading compartments of a three door cage.

FIG. 4B is a top diagrammatic view of the conveyors of this invention showing the conveyor movement among cages.

DETAILED DESCRIPTION OF THE INVENTION

Figure 1A:
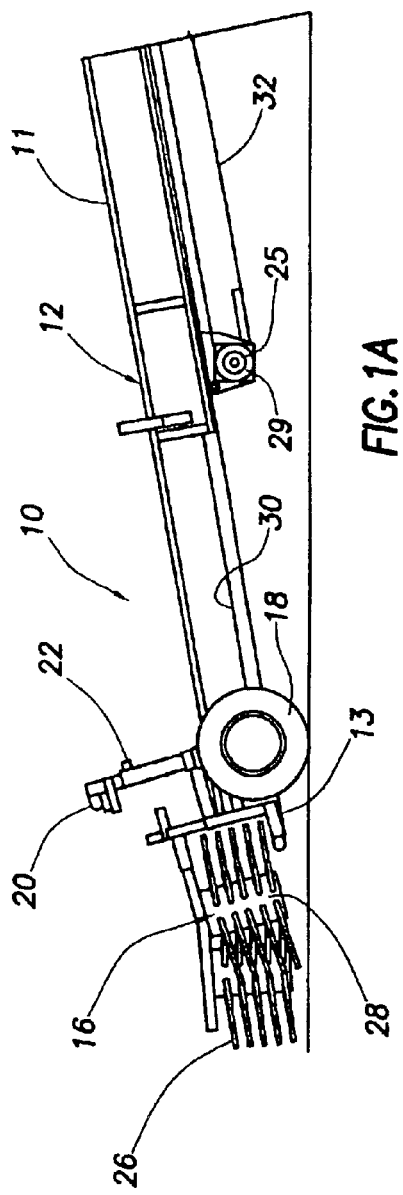
FIG. 1A depicts in side view the front end of a laterally pivotable and longitudinally extendable chickens lifting first longitudinal conveyor assembly having chickens gathering heads at the foremost end of the assembly.
Figure 1B:
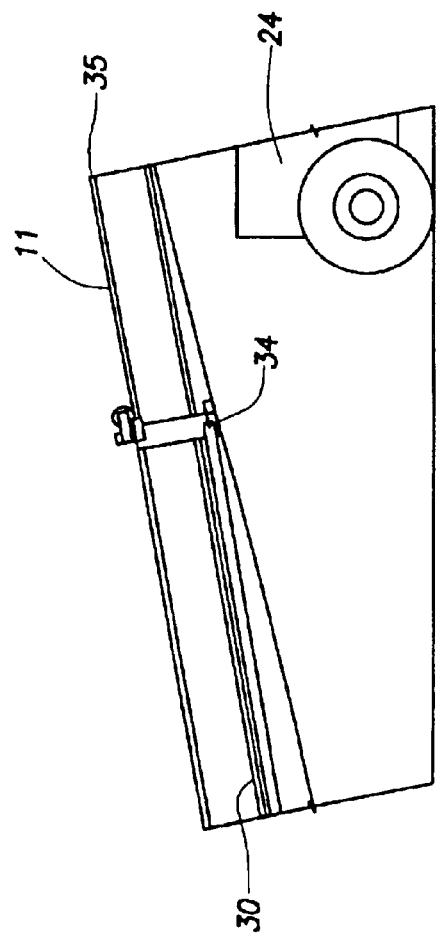
FIG. 1B depicts in side view a more rearward position of the chickens lifting assembly of FIG. 1A with partial view of the front of a vehicle that mounts the first longitudinal conveyor assembly.

Referring to the figures, reference numeral 10 in FIGS. 1A–1C indicates generally a chicken capturing and lift conveyor with novel elements in a complete system for catching and caging chickens for live haul transport to processing plants for slaughter and dressing. Reference numeral 200 in FIGS. 2, 3, 3A–3D indicates generally the cage stager in the system of this invention, also seen partially in other figures. In the description which follows, numerals in the 200's describe elements in the preferred embodiment of the stager depicted in FIGS. 2, 3, 3A–3D. Reference numerals in the 300's are used in describing cages.

Chickens are loaded into front-doored multi-compartmented multi-tier chicken cages 300 (see FIGS. 1C, 3A–3D, and 5A, 5B) having fork tubes 302 extending along the front 304 and back 306 of the cages at the base 308 of the cages transverse to the direction of opening of the front doors 310 of the cages 300. Fork tubes 302 are interconnected at the base 308 of cage 300 by cross members 312. Compartments are indicated by reference numeral 314.

A chicken catcher and lifter 10 (FIGS. 1A–1C) comprises a horizontally pivotable and longitudinally extendible boom 11 including a first longitudinal conveyor assembly 12 having a longitudinally separated front or distal end 13 and an elevated or proximal end 14 of a frame 15. Boom 11 includes a pair of counter rotating chicken capturing heads 16 at distal end 13 for gathering chickens from the floor of a chicken house. Boom 11 is supported at the front end 13 on tired wheels 18 powered and steered by a remotely controlled hydraulically powered steering system of which a hydraulic cylinder and control valves are seen at 20, 22 respectively. Wheels 18 are powered and steered so that boom 11 can be swept left and right. Tractor vehicle 24 provides motive force to drive the wheels of the vehicle and hydraulics used to power other apparatus of the invention as herein more fully described. The counter-rotating chickens gathering heads 16 include distally intermeshing resilient rubber or elastomeric plastic fingers 26 attached at their base to a rotating drum 28. The gathering heads 16 may be raised for clearance and lowered for operation. An endless conveyor belt 30 is entrained over powered roller 29 and passive end roller 31 with reverse length 32 of the belt circulating off floor under the boom over a take-up roller 34 in a known method so that the boom can be extended or retracted to reach chickens without moving tractor 24. Chickens captured by gathering heads 16 are urged between the intermeshing fingers of the gathering heads and step onto the continuously moving conveyor belt, which lifts the chickens received from the gathering heads to the proximal end 14 of boom 11. The boom is enclosed with side walls and a top to channel the chickens to the end 14. Hydraulic motor 25 is operatively coupled to powered roller 29 to drive conveyor belt 30 in the direction of the proximal end 14 at a first belt speed in the range of about 100 to about 400 feet per minute.

Figure 5A:
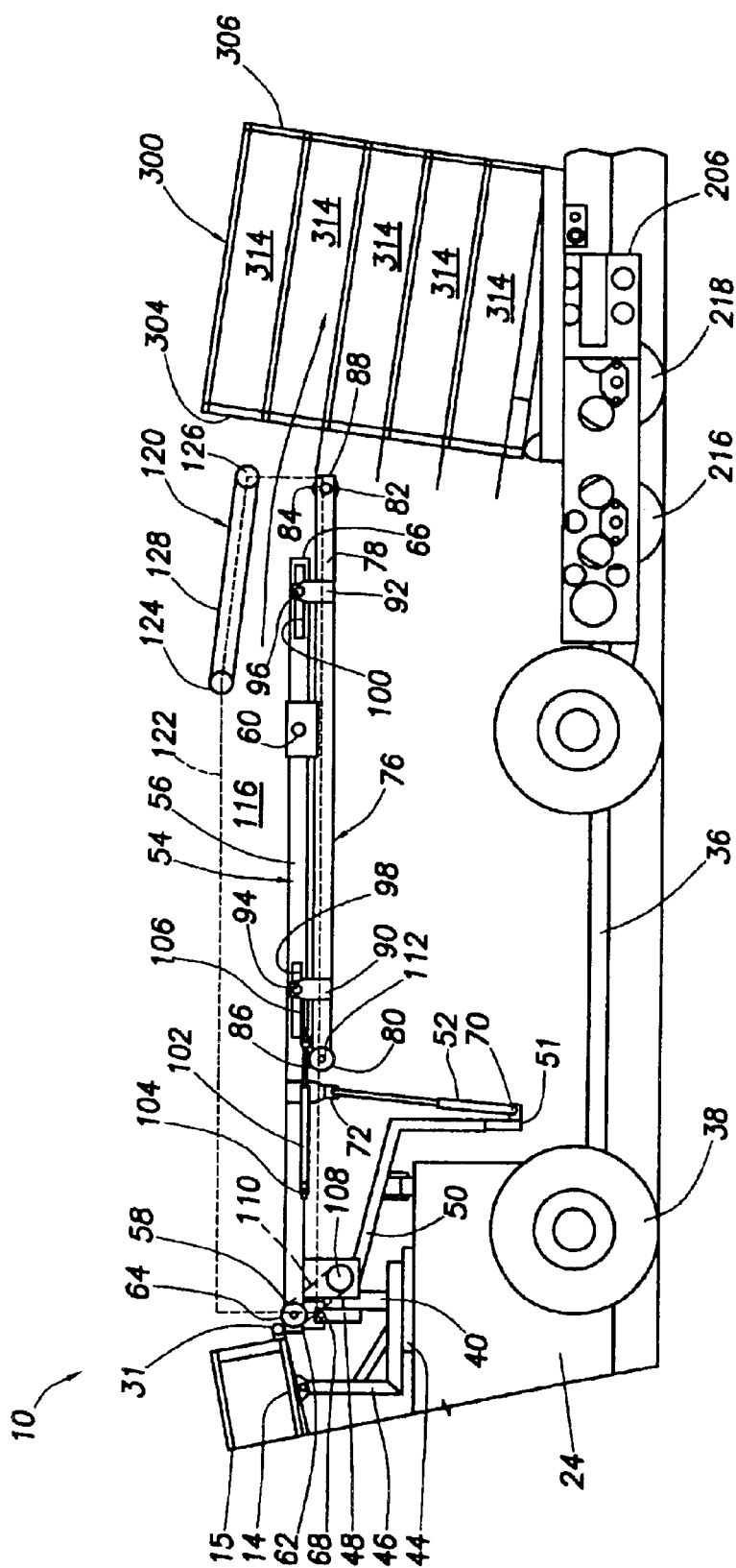
FIG. 5A is a side view of some of the components of the chicken loader system of this invention, with an arrow showing the direction of discharge of chickens by the terminal belt of the loader.
Figure 5B:
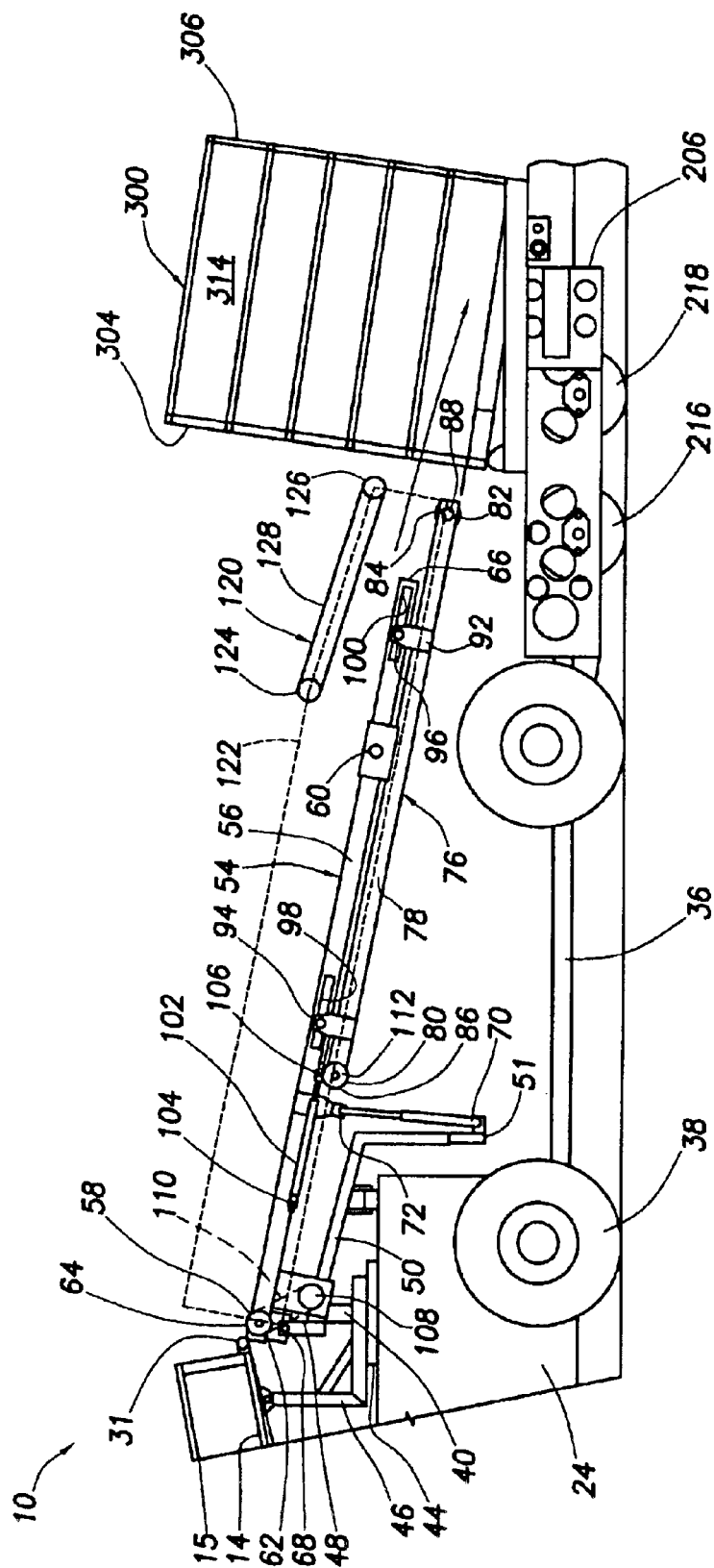
FIG. 5B is a side view the same as FIG. 5A but showing the chickens loader lowered to a position for loading chickens on the lowermost tier of the cage.

Referring to FIGS. 1C, 5A and 5B, tractor 24 comprises a chassis 36 supported on a plurality of wheels 38 powered by a power source contained on the vehicle for driving at least one wheel of the vehicle. Vehicle 24 mounts a vertical post 40 having an axis 42, and supports a bearing base at 44 coaxially disposed around vertical post 40. A first subframe 46 is rotationally supported on bearing base 44 for horizontal movement in an arc centered on axis 42 of vertical post 40. The proximal end 14 of frame 15 of first conveyor belt assembly 12 attaches to subframe 46. The horizontal movement of frame 15 is powered by wheels 18 of boom 11. A second subframe 48 is rotationally supported by vertical post 40 for horizontal movement in an arc centered on axis 42 of vertical post 40. Second subframe 48 includes a member 50 projecting rearwardly of vehicle 24. Member 50 has a distal end 51 which forms the base support for one end of a first prime mover in the form of a hydraulic cylinder and piston assembly 52.

A second conveyor belt assembly 54 comprises a second frame 56, rollers 58 and 60 and belt 62. Second conveyor belt frame 56 has a proximal end 64 and a distal end 66. Proximal end 64 pivotingly attaches on horizontal axis pin members 68 supported on second subframe 48 forwardly of rearwardly projecting arm member 50. Proximal end 64 of frame 56 is disposed relative to proximal end 14 of first conveyor frame 15 for effective transfer of chickens from the first conveyor belt to the second conveyor belt. As shown, proximal end 14 of frame 15 is at a higher elevation than proximal end 64 of second frame 56. This allows frame 15 and frame 56 to rotate on axis 42 without interfering with each other.

As mentioned, hydraulic cylinder and piston assembly 52 connects at one end 70 to distal end 51 of rearwardly projecting member 50. The other end 72 of hydraulic cylinder and piston assembly 52 connects to second conveyor belt frame 56, for raising or lowering the distal end 66 of frame 56 in an arc about the horizontal axis pin members 68.

A third conveyor belt assembly 76 comprises a third frame 78, rollers 80, 82 and belt 84. Third conveyor belt frame 78 has a proximal end 86 and a distal end 88. On frame 78, fixtures 90 and 92 mount bearings 94, 96 respectively in slots 98, 100 formed in second conveyor frame 56. This maintains third conveyor frame 78 in longitudinal alignment with and longitudinally slidably mounted on second conveyor belt frame 56. A second prime mover in the form of a hydraulic cylinder and piston assembly 102 is connected at one end 104 to second conveyor belt frame 56 and at the other end 106 to third conveyor belt frame 78. Movement of the piston in the cylinder slidingly extends and retracts third conveyor belt frame 78 on second conveyor belt frame 56.

Hydraulic motor 108 is operatively coupled by drive belt 110 (shown in dashed line so as not to obscure structures behind it) to second conveyor belt frame roller 58, for driving second conveyor belt 62 in the direction of distal end 66 at a second belt speed in the range of about 200 to about 600 feet per minute that is faster than the first belt speed. Hydraulic motor 112 is operatively coupled directly to drive roller 80 for driving third conveyor belt 84 in the direction of distal end 88 of third conveyor belt assembly 76 at a third belt speed in the range of 500 to about 1400 feet per minute that is faster than the second belt speed.

Side walls or curtains are furnished on all three conveyor frames to prevent chickens moving on the conveyors from fleeing or falling from the sides of the conveyor. Reference 116 indicates side curtains for second and third conveyor assemblies 54, 76.

A fourth conveyor assembly 120 overlays a distal portion including distal end 88 of third longitudinal conveyor belt assembly 76, and comprises a frame support 122 (shown in dashed line to avoid obscuring other structure), rollers 124, 126 and belt 128. A hydraulic motor directly operates roller 124 for driving belt 128 of fourth longitudinal conveyor assembly 120 in the same direction as belt 84 of third longitudinal conveyor belt assembly 76 at a fourth belt speed in the range of 500 to about 1400 feet per minute substantially the same as the third belt speed.

In operation, chicken capturing heads 16 sweep chickens onto the distal end 12 of conveyor belt 30 which carries the chickens at a belt speed in the range of from about 100 to 400 feet per minute to a second belt 62 on second conveyor assembly 54, which increases the speed of the birds with a belt speed in the range of about 200 to 600 feet per minute. Chickens are passed from the second belt to the third belt where the speed is in the range from about 500 to about 1400 feet per minute. The speed ranges overlap for speed selection of the operator according to weight of the chickens, wetness if any, width of the belt (wider belts allow slower speeds), etc., but each succeeding belt will always be run considerably faster than the preceding belt, in order to get the chickens brought up to the final cage loading speed. In general, if the loading speed is selected at 800 feet per minute, the second belt is operated at a speed of 400 feet per minute and the first belt is operated at a speed of 200 feet per minute. If the loading speed is as low as 500 feet per minute, the second belt may be operated at about half that, or 250 feet per minute, and the first belt at half the second belt speed, or about 125 feet per minute. For a 16 inch wide belt loading broiler chickens, we have found a loading speed of 800–900 feet per minute produces satisfactory results. After the chickens are loaded into one compartment of a cage, for example an upper compartment 314 as shown in FIG. 5A, an operator pushes or pulls frame 78 of third conveyor assembly 76 to move distal end 88 in front of another compartment on the same tier as the compartment just filled and continues the loading. Frame 56 of second longitudinal conveyor assembly swings on vertical axis 42 of vertical post 40 when the operator pushes or pulls frame 78 to move distal end 88 of third longitudinal conveyor belt assembly 76 horizontally. Frame 78 moves in an arc centered on vertical axis 42 (see FIGS. 4A and 4B) when the operator pushes or pulls frame 78 to a position in front of another compartment at the same elevation as the compartment already loaded. This is repeated for each compartment in a tier, normally.

When all compartments on a tier are loaded, the operator causes hydraulic piston 52 to retract, to lower distal end 88 to a lower tier (or to extend to elevate distal end 88 to a higher tier, as the case may be). This turns frame 56 of second longitudinal conveyor assembly 54 about the horizontal axis of pin members 68 of second subframe 48 to move distal end 88 of third longitudinal conveyor belt assembly 76 vertically in an arc centered on horizontal axis pin members 68 to a position in front of a compartment of the cage at an elevation different from the elevation of the compartments already filled.

As shown in FIG. 5A, cage 300 is tilted back. As a result each higher tier is further removed from distal end 88 of third conveyor belt 84 than the tier beneath it. Accordingly, when lowering distal end 88 of third conveyor belt 84 to a lower tier, the operator engages hydraulic piston 102 to slide third conveyor assembly 76 in the direction of vehicle 24 on bearing mounts 94, 96 in slots 98, 100 formed in second conveyor frame 56 to adjust for the spacing difference created by tilt of cage 300 and place the distal end 88 loadingly in front of an opened compartment door of the next lower tier. This will be in front of the edge of a door as shown in FIGS. 5A and 5B. Although diagrammatic FIGS. 4A and 4B have the distal end 88 over some part of the door, normal cage height and roller and frame thickness in most instances will reduce the vertical zone through which chickens must pass off end 88 into the cage compartment too much to allow placement over the door.

In FIG. 5A, the upper tier has been filled and the doors closed by an operator, and the second tier down is being filled, so the doors to that tier and doors of the lower Turning now to the staging apparatus used with the loader apparatus, tractor 24 has a hitch post (position indicated generally at 50 but not seen) onto which leading chassis 200A of stager 200 is hitched by a forwardly extending tongue for tow. Leading chassis 200A includes a frame having am imaginary longitudinal centerline (generally and partially indicated by reference numeral 210A in FIG. 3) intermediate leading chassis sides 203A and 203B and a front end 205. Rear portion 208 of leading chassis frame 204 mounts (transversely to longitudinal centerline 210A) at least one wheel axle 212 carrying wheels 216, preferably, as shown, tandem axles 212, 214 carrying tired wheels 216, 218, supporting the rear portion 208 of the leading chassis frame above ground level. A rear platform 220 is supported on rear portion 208 of the leading chassis frame above the tandem axle wheels. As described above, the overhead clearance of a chicken house is limited when catching chickens, and accordingly, the height of platform 220 must be kept as low as possible. The tired wheels 216, 218 for the wheels are therefore preferably of the smallest diameter than can reliably carry an extremely heavy vertical load and still advance over the wood shaving or other yielding litter floor typical of most chicken houses (which may become boggy reducing traction even more if water escapes from chicken waters that are raised to the ceiling rafters during catching).

Alignment members 222, 223 and connecting L-shaped latching members 224, 225 at the rear 206 of the leading chassis frame (see FIGS. 1C and 3) respectively matingly align and latchingly connect leading chassis 200A to trailing chassis 200B. Trailing chassis 200B is seen in side view in FIG. 1D. Alignment male members 222, 223 insert into recessed female tubing members (not seen) on trailing chassis 200B. Once the alignment members matingly align leading chassis 200A to trailing chassis 200B, L-shaped latching members 224, 225 are spread apart to engage vertical tubing frame members of trailing chassis 200B against the outside of the longitudinal arms (longitudinal being from front to rear parallel to centerline 210A) of the latching members 224, 225 and rearward (towards tractor 24) of the transverse arms of latching members 224, 225. A hydraulically powered piston powers the spread of latching members 224, 225 and holds them against the vertical tubing of trailing chassis as described. Referring back to forwardly extending tongue of leading chassis 200A, the connection of leading chassis 200A to trailing chassis 200B is further described. In the process of mating alignment members 222, 223 with the female tubing of trailing chassis 200B, trailing chassis 200B is pushed forward to mount the female tube members onto the male alignment members 222, 223, using a fork lift with its forks lowered on the fork lift mast pressing against the rear 253 of trailing chassis 200B, or alternatively, the fork lift holds stationary the rear 253 of trailing chassis 200B and tractor 24 moving in reverse urges alignment members 222, 223 into the female tubing members of trailing chassis 200B, or a combination of both movements is made. It is necessary for rear 206 of leading chassis 200A and front end 252 of trailing chassis 200B to be level on completion of coupling of leading chassis 200A and trailing chassis 200B. To assure they are level, a hydraulic cylinder has its rear end (facing away from tractor 24) attached to a lower support sub-frame or base and the piston rod of the cylinder rod attached to the upper end of a lever. The lower end of the lever is pivotally connected to the tongue of leading chassis 200A. Extension of the piston rod pivots the lever to press down on the tongue. Pressing down on the tongue kicks up the rear end 206 of leading chassis 200A and assists vertical alignment of mating members 222, 223 with the receiving members of trailing chassis 200B. The reaction of the piston rod into the cylinder pulls the lever toward it and lifts the tongue vertically, lowering the rear 206 of leading chassis 200A, if needed for vertical alignment of the mating alignment members 222, 223.

Figure 3:
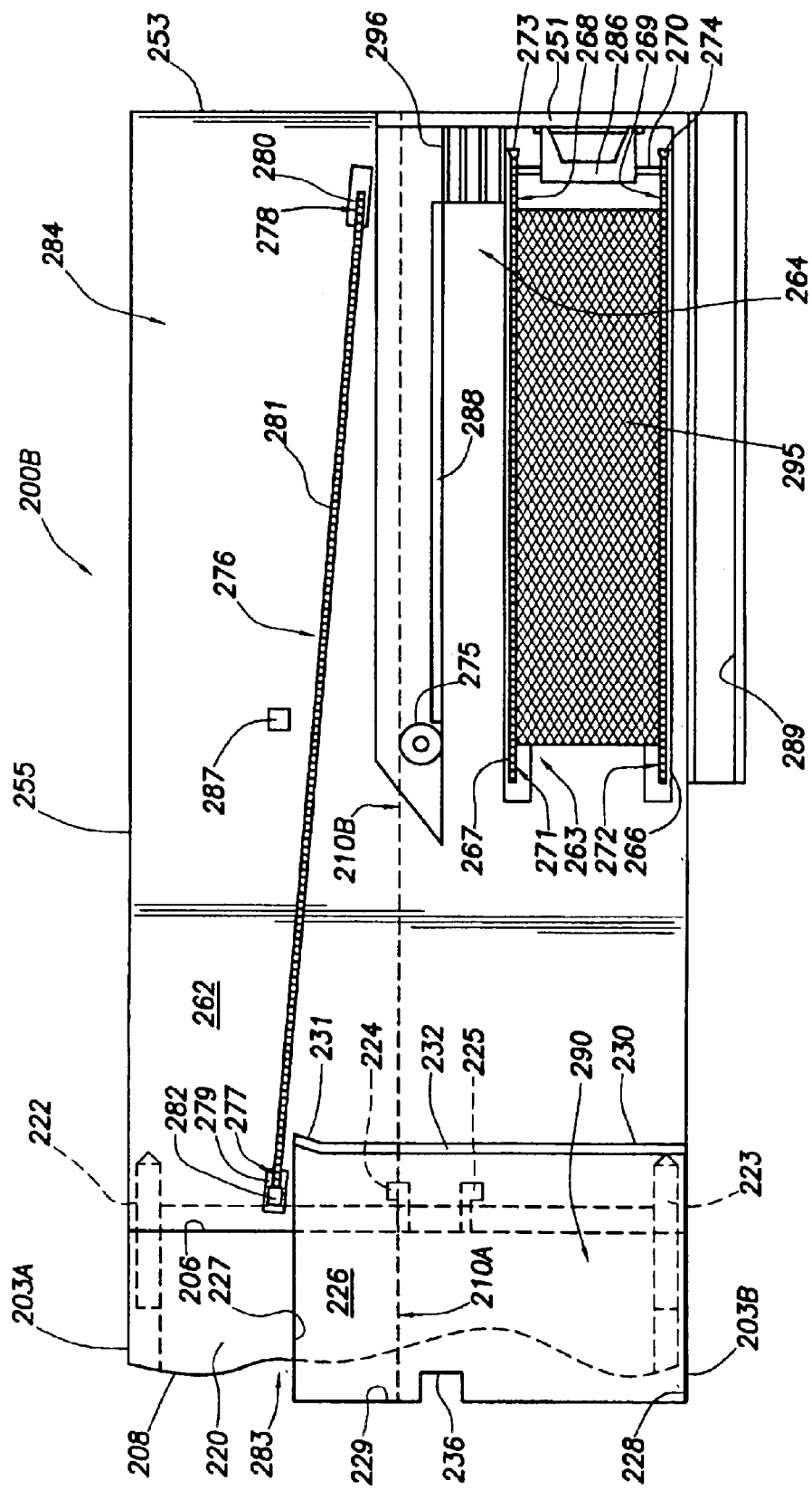
FIG. 3 is a top view of the coupled leading and trailing chassis of the cage stager of FIG. 2.
Figure 3A:
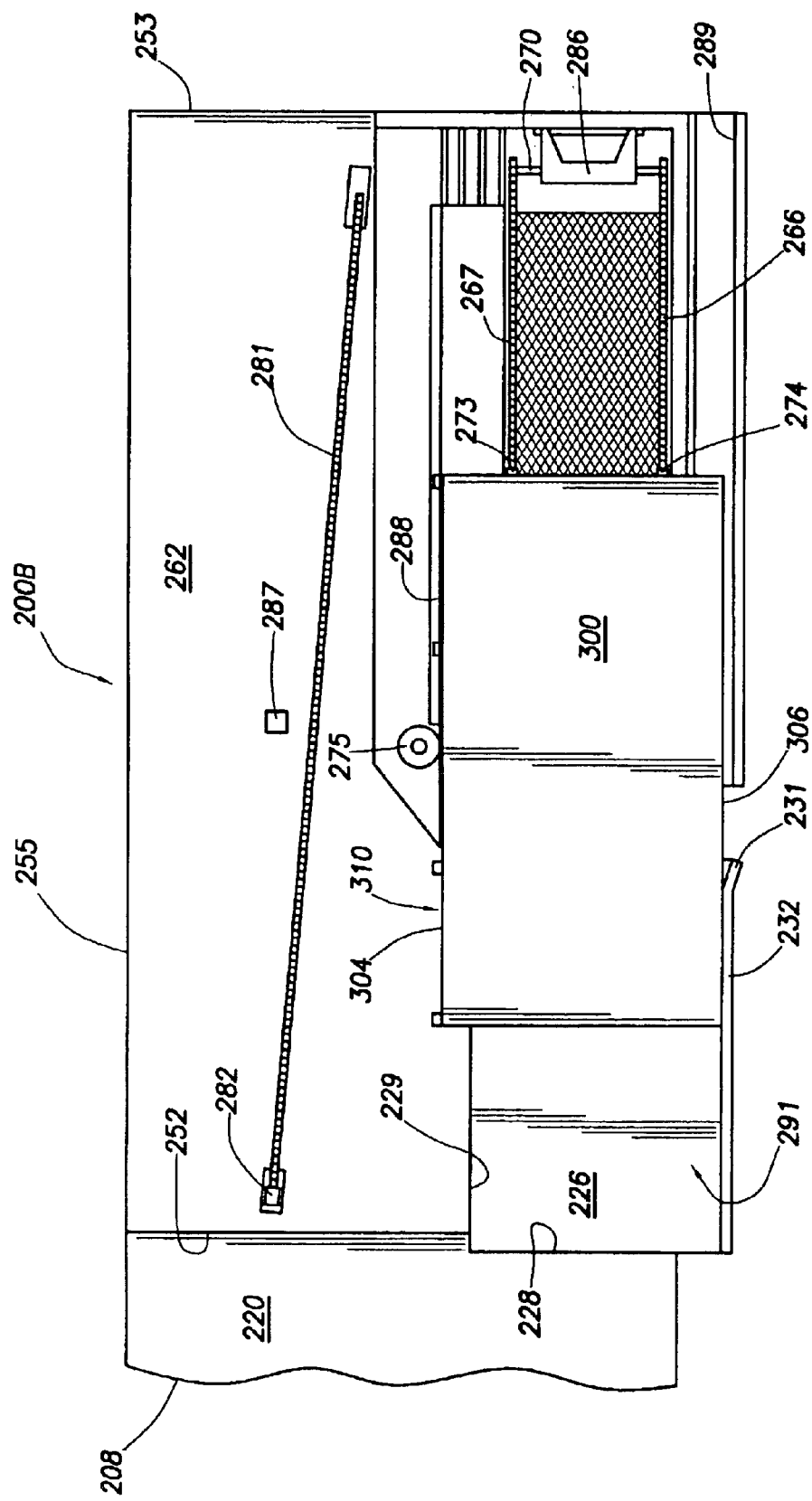
FIG. 3A is a top view of the coupled leading and trailing chassis of the cage stager of FIG. 3 showing a chicken cage in the process of movement from a place of origin to a place of filling.

Referring to FIGS. 3 and 3A–3D, the join line between front leading chassis 200A and trailing chassis 200B is indicated at 206, the rear end of the leading chassis. A tray 226 is horizontally and pivotally mounted and supported on rear platform 220. The vertical pivoting axis (not shown) for tray 206 is understood on one side of centerline 210A. Tray 226 has a front end 227, a rear end 228, and opposing sides 229, 230. Tray 226 is pivotable to and from a home position 290 as it is shown in FIG. 3, in which the sides 229, 230 are transverse to the imaginary centerline 210A of leading chassis 200A, from and to an away position 291 shown in FIG. 3A in which the sides 229, 230 of the tray are longitudinal to centerline 210A of the leading chassis 200A. Power for pivoting tray 226 is from a hydraulic cylinder/piston/piston rod operatively coupled to a lever arm on a tray pivot shaft extending below the deck of leading chassis 200A. The in-side 229 of tray 226 is closer to leading chassis centerline 210A than the out-side 230 when tray 226 is in the away position 291.

Figures 6A, 6B:
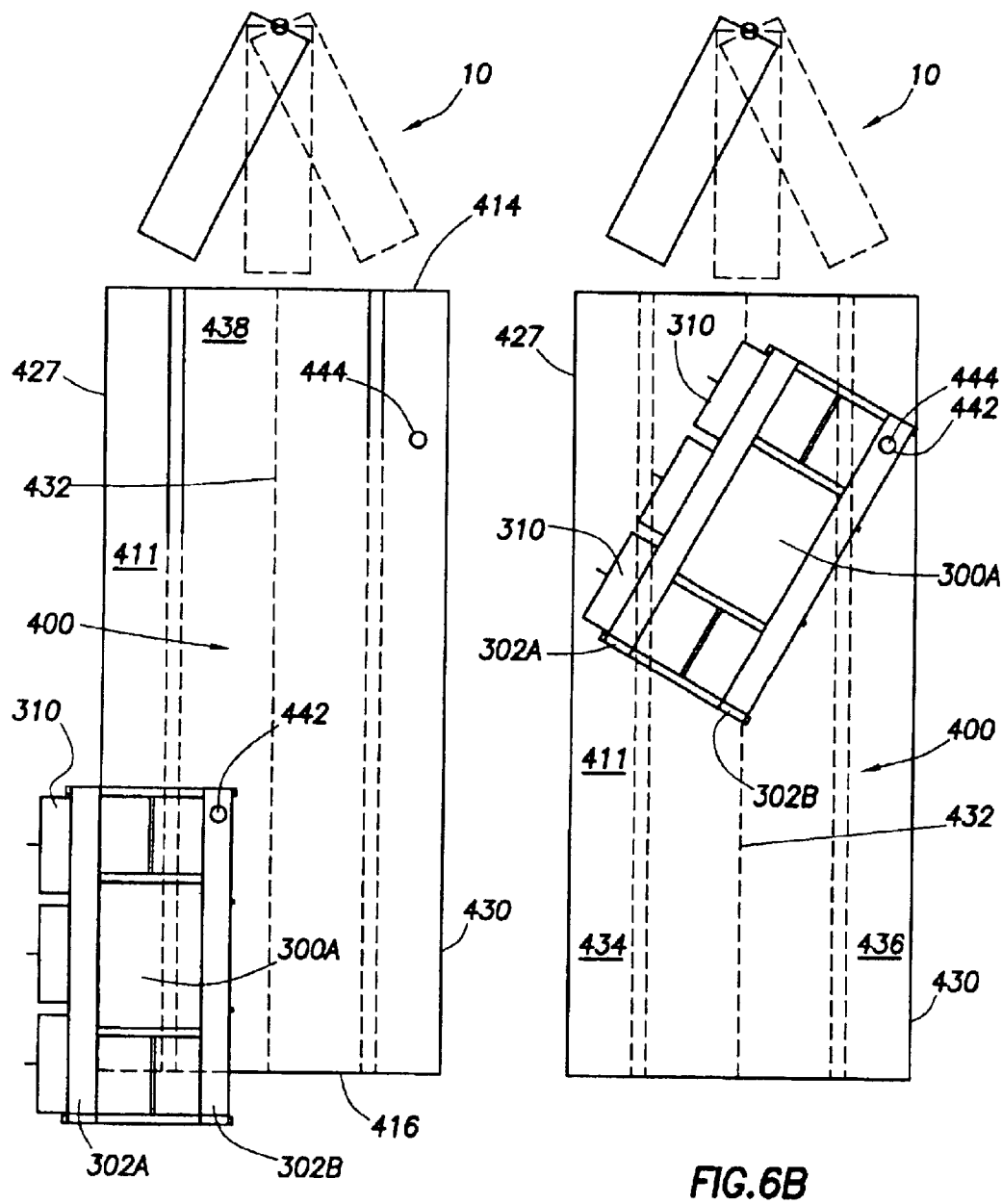
FIG. 6A a top view of an alternative embodiment of a stager of this invention, showing a first cage at the place of origin.
FIG. 6B is a top view of the stager of FIG. 6A, showing the first cage being moved to the place of filling.
Figures 6C, 6D:
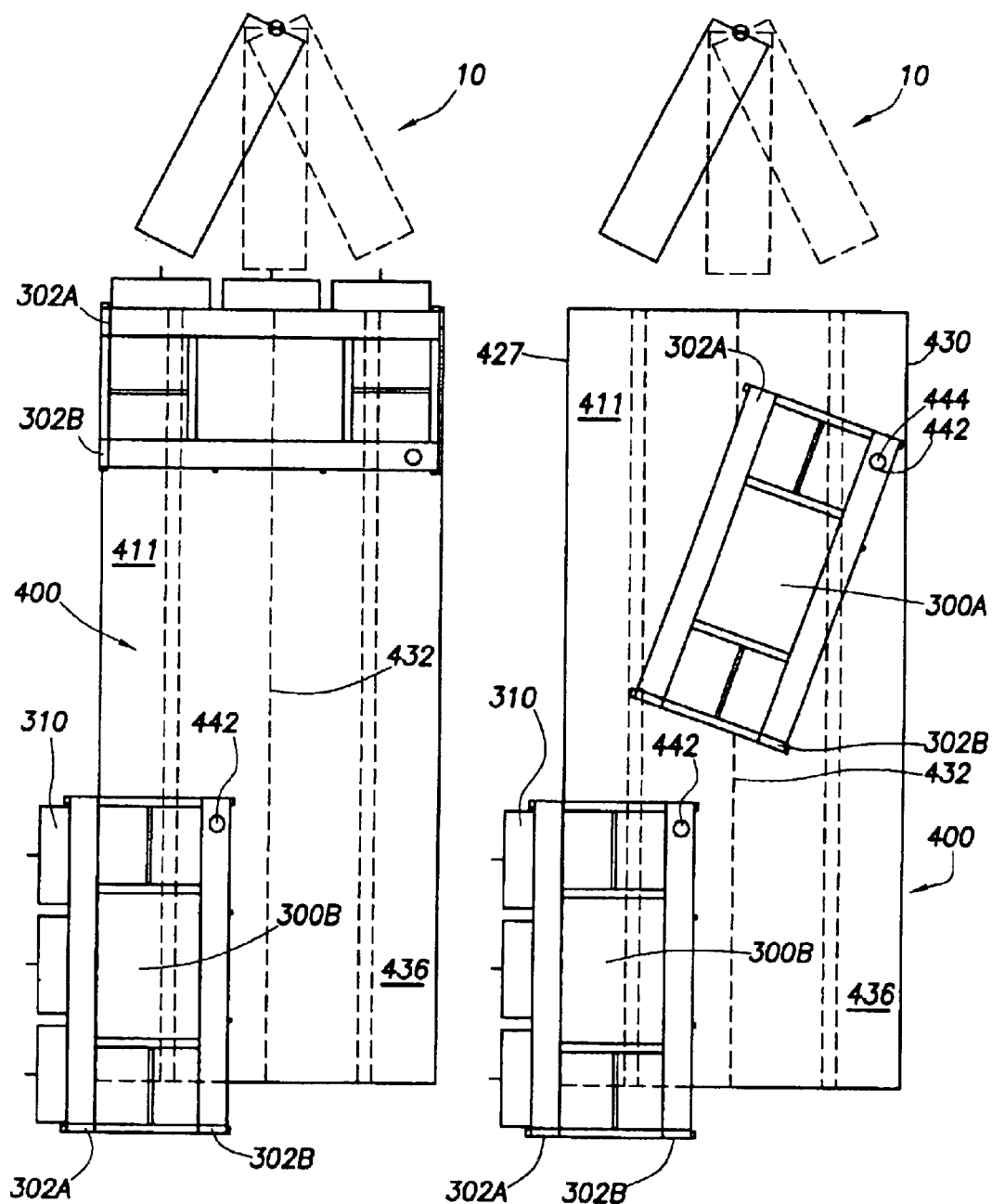
FIG. 6C is a top view of the stager of FIG. 6A, showing the first cage at the place of filling and a second cage at the place of origin.
FIG. 6D is a top view of the stager of FIG. 6A, showing the first cage being moved to the place of destination.
Figure 6E:
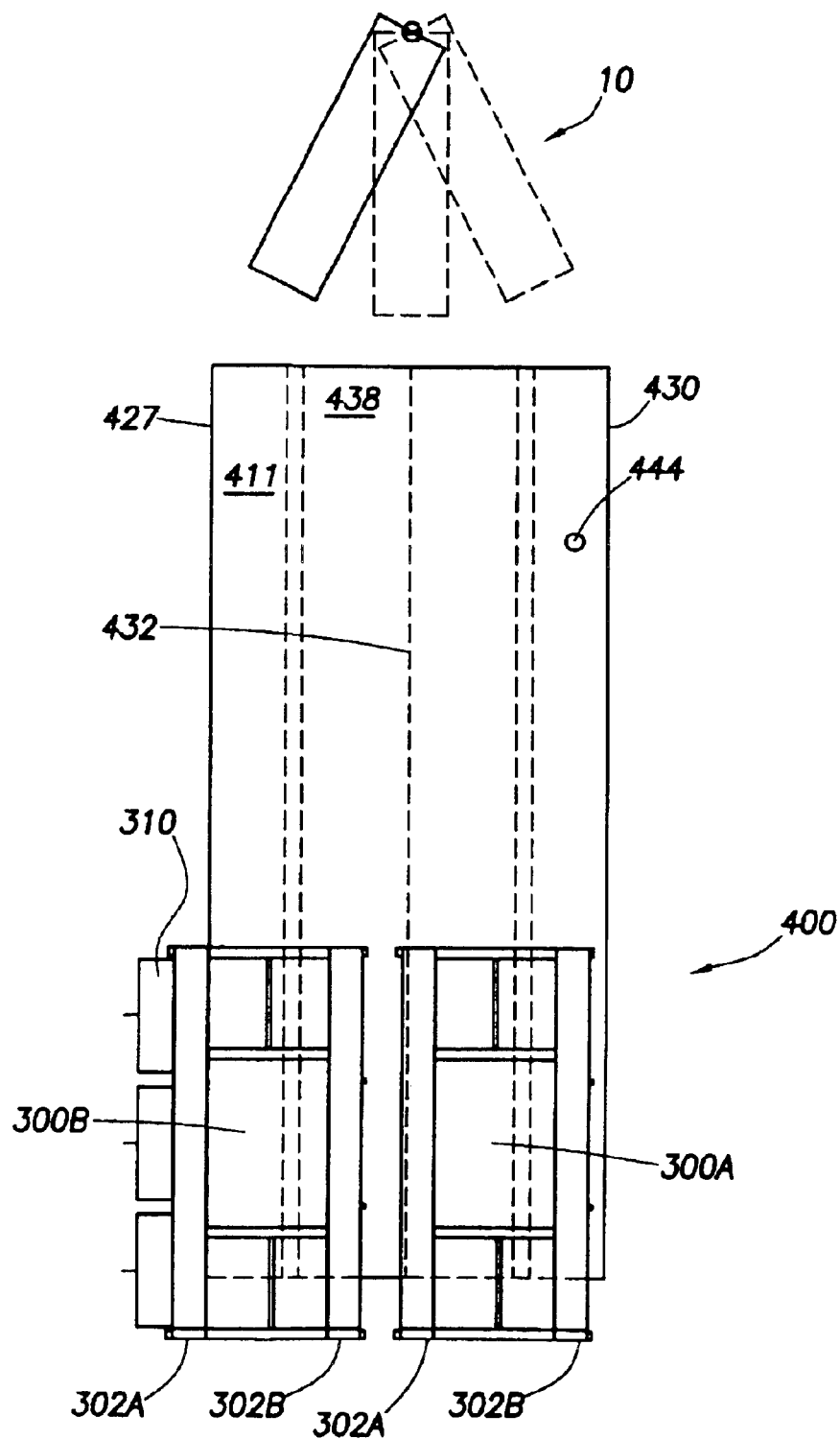
FIG. 6E is a top view of the stager of FIG. 6A, showing the first cage at the place of destination ready for removal from the stager.

An elevator 234 is attached to the leading chassis frame adjacent the foremost end of rear portion 208 and is elevatable above rear platform 220 under the urging of a hydraulic cylinder/piston/piston rod below the deck of platform 220. The elevator suitably is a lever actuated below deck by a piston or may be a piston rod itself. In-side 229 of tray 226 has an opening 236 through which elevator 234 can elevate above tray 226 when tray 236 is in home position 290. Out-side 230 of tray 220 comprises an upstanding retainer member 232 which flares outwards at 231 adjacent front end 227. Out-side retainer member 232 braces the base 308 of the cage 300 when cage 300 is tilted up by elevator 234 (see FIGS. 2, 6A and 6B) with tray 226 in home position 290 (FIG. 3).

Referring now to FIGS. 1D, 3, 3A–3D, reference numeral 200B indicates the trailing chassis which has been referenced in respect to the description of joining it to leading chassis 200A. Trailing chassis 200B comprises a trailing chassis frame 251 having front end 252, rear end 253, and longitudinal sides 254, 255. A longitudinal imaginary centerline between sides 254, 255 is indicated by dashed line 210B on FIG. 3. At front end 252 are mating and cooperating members as described above for the aligning members 222, 223 and latching members 224, 225 for connecting trailing chassis 200B in longitudinal alignment with leading chassis 200A. Trailing chassis frame 251 transversely mounts at least one axle, and as shown three axles 256, 257 and 258, for carrying wheels 259, 260 and 261 for supporting trailing chassis 200B above ground level at the same elevation as the level of leading chassis 200A. A supporting surface or deck 262 is mounted on the trailing chassis frame.

A first cage mover indicated generally by reference numeral 263 is supported by trailing chassis frame 251 in a rear portion of trailing chassis 200B on the same side of trailing chassis centerline 210B where tray 226 on leading chassis 200A is in the away position 291. Such rear portion is a place of origin as that term is used herein and is indicated generally by reference numeral 264.

The first cage mover is a first force transmission movement carrying an engager and situated in such place of origin 264 for engaging a chicken cage 300 placed there with cage fork tubes 302 longitudinally aligned substantially parallel to trailing chassis centerline 210B and with cage doors 310 facing centerline 210B and for moving the engaged cage 300 so aligned toward the front end 252 of trailing chassis 200B and onto tray 226 in the away position 291 on trailing chassis 220B.

The first force transmission drive comprises one or more flexible members of a loop, preferably a pair of chains 266, 267, carried on rotating supports for travel in a forward direction toward front 252 of trailing chassis 200B above surface 262 and for travel in a reverse direction toward rear 253 of trailing chassis 200B under surface 262. More particularly, the rotating supports are spaced chain sprocket wheel pairs 268, 269 on a first sprocket wheel axle 270 affixed to the trailing chassis frame transverse to the centerline, and spaced chain sprocket wheel pairs 271, 272 on a second sprocket wheel axle affixed to trailing chassis frame 251 transverse to the centerline and spaced from sprocket wheel axle 270. A motive driver, suitably a hydraulic motor, not seen, is connected to one or both of such axles for powering turning of at least one of the sprocket wheel pairs 268, 269 and 270, 271. Chains 266, 267 carried out on the first and second sprocket wheel pairs 268, 269 and 270, 271 run parallel to centerline 210B of trailing chassis 200B.

A pair of projections 273, 274 are carried by each of the chains 266, 267 at the same points along the length of the chains. The projections constitute engagers, and are of height adapted to press against base 308 of chicken cage 300 placed on rear portion 253 of trailing chassis 200B with cage fork tubes 302 longitudinally aligned substantially parallel to trailing chassis centerline 210B when projections 273, 274 are above surface 262.

Between chains 266, 267 is an expanded metal deck portion 295. Trailing chassis frame structure is indicated at 296.

Figure 3B:
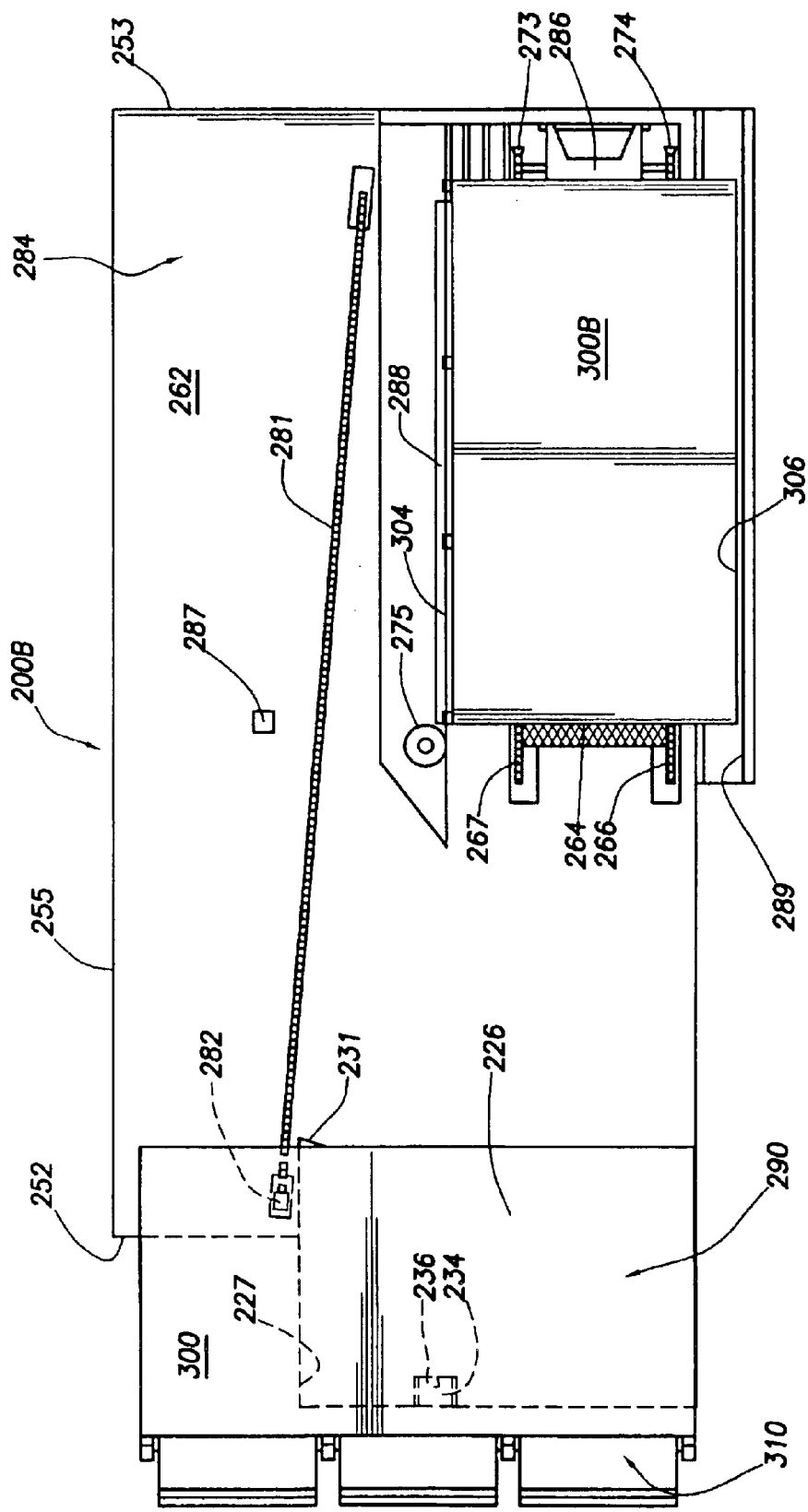
FIG. 3B is a top view taken along the line 3B of FIG. 2 and shows chicken cages staged on the stager, one positioned at a place of origin and the other positioned at a place of filling.
Figure 3C:
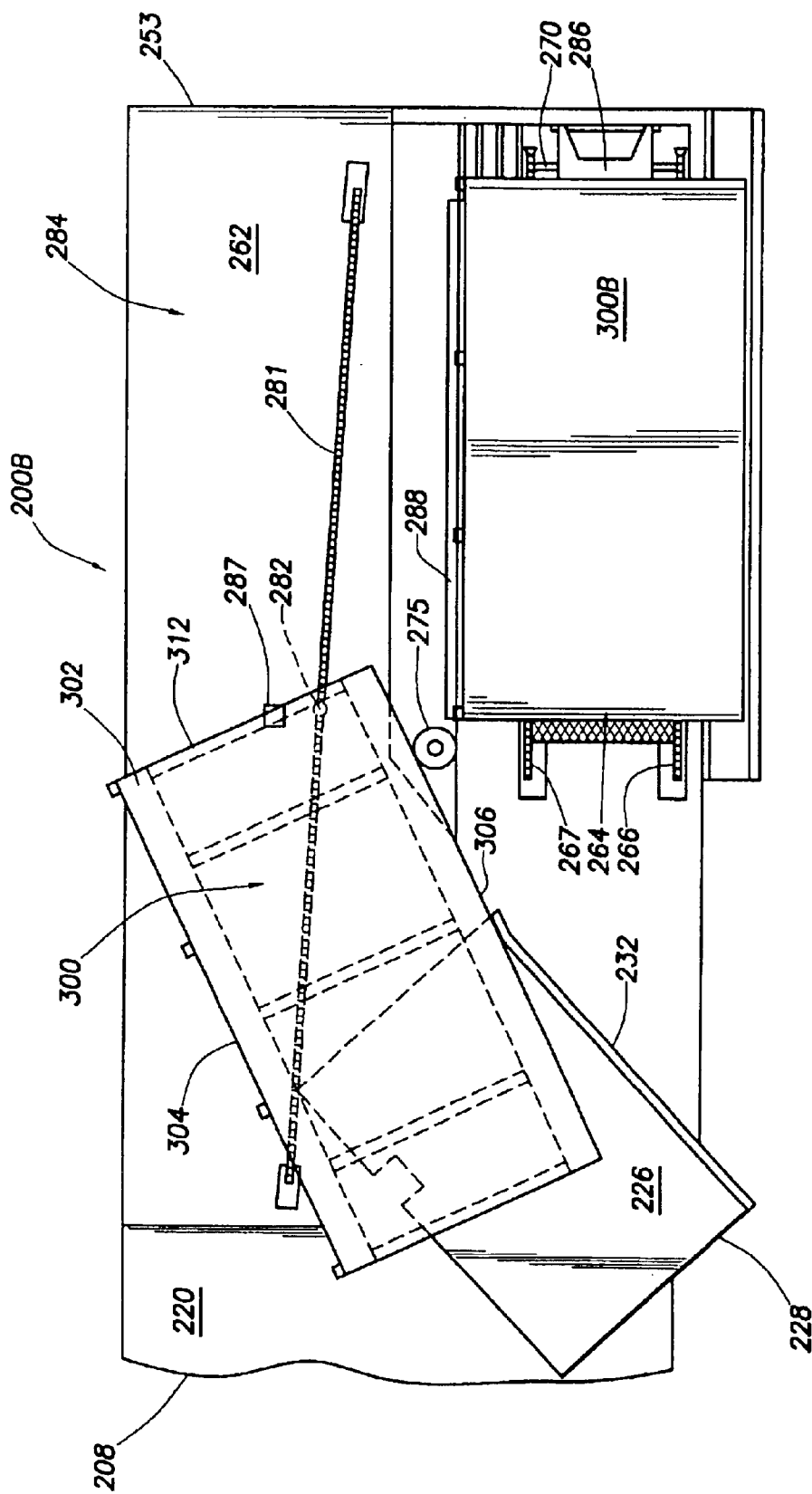
FIG. 3C is a top view of the stager of FIGS. 2–3B showing movement of a lead cage going from the place of filling to the place of destination on the stager.

When the responsible operator commands cage 300 to be advanced from the place of origin 264 to the place of filling 283, a hydraulic motor powers rotation of chains 266, 267 and projections 273, 274 engage and move cage 300 on chains 266, 267 toward front end 252 of trailing chassis 200B and onto tray 226 positioned in away position 291. When cage 300 is pushed as far as projections 273, 274 will advance it, it is essentially fully butted against a back lip of tray 226 and alongside retainer member 232. Tray 226 is then pivoted a quarter turn counterclockwise (in the embodiment depicted) to home position 290 (see FIG. 3B). At this time a second cage 300B can be deposited onto place of origin 264. Doors 310 are opened (FIG. 3B) and the operator elevates cage 300 to the preset level of tilt, suitably about 12 degrees. As seen in FIG. 3B, in home position 290, tray 226 rested on trailing chassis 200B when tilted and is elevated over the rear platform 220 of leading chassis 200A.

Trailing chassis 200B further optionally comprises a pivot member 275 adjacent and partially overlapping trailing chassis centerline 210B (see FIG. 3). Experience has shown that the pivot is helpful but with careful dimensioning of platform and draw components involved in cage mover 276, is not always necessary. Pivot member 275 is described as an optional inclusion only.

A second cage mover 276 is located on trailing chassis 200B on the side of trailing chassis centerline 210B opposite cage mover 263. Second cage mover 276 comprises sprocket wheel 277 and sprocket wheel 278 respectively on spaced sprocket wheel axes indicated at 279, 280 and chain 281 carried on sprocket wheels 277, 278 with an upper run of the chain proximate the surface of supporting surface 262. Sprocket wheel axle 278 and sprocket wheel 280 are adjacent rear end 253 of trailing chassis 200B. Sprocket wheel axle 279 and sprocket wheel 277 are adjacent front end 252 of trailing chassis 200B. Sprocket wheel axle 280 and sprocket wheel 278 are closer to the trailing chassis frame centerline than sprocket wheel axle 279 and sprocket wheel 277. A projection 282 is carried by chain 281 for pressing against base 308 of a chicken cage 300 when projection 282 is above surface 262 of chassis 200B.

Figure 3D:
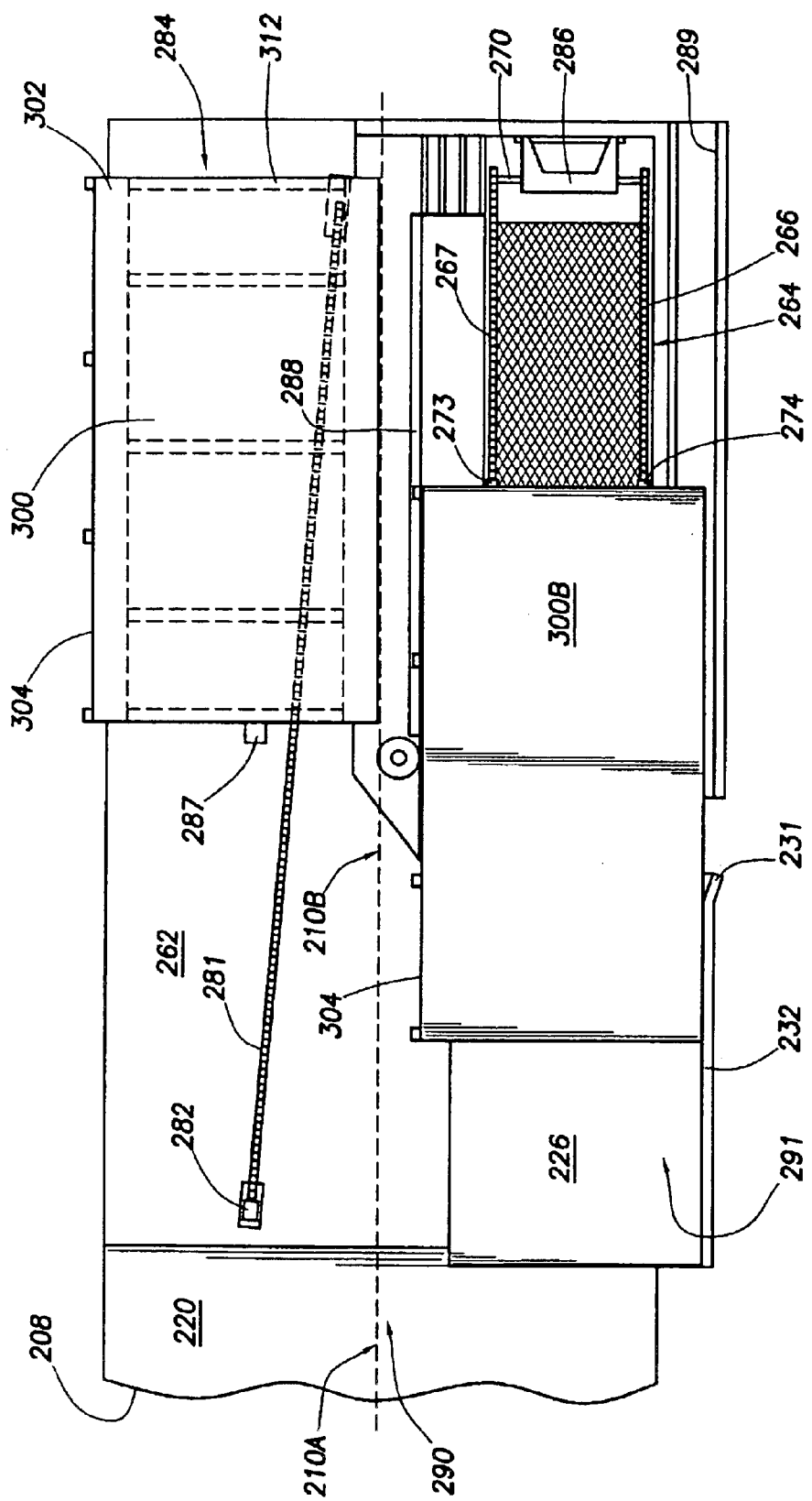
FIG. 3D is a top view of the stager of the preceding figures with the lead cage arrived a the place of destination and the trailing cage in the process of transfer from the place of origin to the place of filling.

Projection 282 serves as an engager for engaging cage 300 on tray 226 when tray 226 is in the home position 290 largely on leading chassis 200A. This home position 290 is at the place of filling 283, where chickens are loaded into cage 300. Chain 281 carrying the engager projection 282 acts to engage an outside cross member 312 connecting fork tubes 302 on the underside of cage 300 and move the so engaged cage 300 towards a rear portion or place of destination indicated generally by reference numeral 284 on trailing chassis 200B (see FIG. 3C). Rear portion or place of destination 284 is located on the opposite side of the centerline 210B from the place of origin 264. In pulling cage 300 toward place of destination 284, engager 282 turns front 227 of tray 226 clockwise in the direction of away position 291, optionally suitably also pivoting the back 306 of cage 300 on pivot member 275, and aligns the cage 300 with fork tubes 302 substantially parallel to centerline 210B of chassis 200B when cage 300 is at the rear portion or place of destination 284 with cage doors 310 facing away from centerline 210B (see FIG. 3D). Tray 226 is moved completely to away position 291 (see FIG. 3D) by the hydraulic cylinder actuating it, placing it in ready position for receipt of the trailing cage 300B, as shown in FIG. 3D.

When the loading empty cages 300 at the place of origin 264 on trailing chassis 200B, a fork truck driver lowers the cage and to correctly place the cage, backs up until the side of the cage strikes a stop 286, then lowers the cage onto the platform of trailing chassis 200B. When picking up a loaded cage at the place of destination 284, the fork truck driver inserts the forks into fork tubes 302 (FIG. 3D). A depressible stop 287 prevents the cage from being pushed back during fork insertion. Stop 287 is spring loaded so that when loaded cage 300 is being moved from the place of filling 283 to the place of destination 284, it is depressed below the surface of the platform and poses no obstacle to passage of the cage. It springs up after the cage passes over it.

Assisting proper alignment of an empty cage deposited at the place of origin 264 are inside guide rails 288 and outside guide rails 289. Outside guide rails 289 fold up for over the road transport of trailing chassis 200B.

Thus a systematic method of loading chickens in a chicken house into a series of front-doored multi-compartmented chicken cages, comprises (a) placing a first of a series of empty said poultry cages on a platform having a front end and a longitudinal centerline, initially such that the cage is on one side of the centerline with the cage doors facing said centerline, then (b) moving the cage to a front portion of the platform transversely to the centerline with the doors facing the front of the platform, (c) receiving and conveying the chickens from ground level on a longitudinally revolving continuous belt to a higher elevation, (d) transferring the chickens to one or more serially generally longitudinally arranged revolving continuous belts including a terminal belt, (e) operating said belts to increase the speed of the chickens on the belts to a terminal speed in the range of 500 to 1400 feet per minute, (f) discharging the chickens at said terminal speed from a distal end of said terminal belt directly into a facing open compartment in said cage, (g) relocating the terminal belt and discharging chickens into another facing open compartment in said cage, (h) repeating operations (c)–(g) until the cage is loaded with chickens, (i) after the cage is loaded with chickens, moving the loaded cage on said platform to the opposite side of the centerline from where the empty cage was initially placed so that the doors of the cage face away from the centerline, (j) removing the first cage from the platform, (k) at anytime after operation (b), placing a second of said series of empty chicken cages on said platform, such that the second cage is on said one side of the centerline with the cage doors facing said centerline, and then repeating operations (b)–(j) with respect to said second cage.

More particularly, in operation of the foregoing apparatus, a method of picking up chickens from the floor of a chicken house and loading the chickens into a series of front-doored multi-compartmented multi-tier chicken cages 300 having fork tubes 302 extending along the front 304 and back 306 of cage 300 at base 308 of cage 300 transverse to the direction of opening of front doors 310, comprises (a) placing a first cage 300A on one side of centerline 210B in a rear portion or place of origin 264 on support surface 262, with cage fork tubes 302 longitudinally aligned substantially parallel to the longitudinal centerline 210B and the cage doors 310 facing the centerline; (b) engaging first cage 300A placed on rear portion or place of origin 264 and moving the engaged cage 300A so aligned toward the front end 252 of chassis 200B and onto tray 226 in an away position 291 of tray 226; (c) moving tray 226 to the home position 290 where the cage doors 310 face the foremost end 209 of rear portion 208 of leading chassis 200A; (d) without regard to operations "(a)"–"(c)", (d)(1) receiving chickens on a first longitudinal conveyor belt assembly comprising a frame, rollers and belt, the assembly sloping upwardly from adjacent ground level to an elevated end, and conveying the chickens on the belt thereof toward the elevated end at a first belt speed in the range of about 100 to about 400 feet per minute, (d)(2) receiving chickens from the elevated end of the first longitudinal conveyor belt essentially at the first belt speed onto a proximal end of a second longitudinal conveyor belt assembly comprising a frame, rollers and belt, and conveying the chickens on the belt of the second longitudinal conveyor assembly toward a distal end thereof at a second belt speed in the range of about 200 to about 600 feet per minute that is faster than the first belt speed, (d)(3) receiving chickens from the distal end of the second longitudinal conveyor belt essentially at the second belt speed onto a proximal end of a third longitudinal conveyor belt assembly comprising a frame, rollers and belt, conveying the chickens on the belt of the third longitudinal conveyor assembly toward the distal end thereof at a third belt speed in the range of 500 to about 1400 feet per minute that is faster than the second belt speed, and discharging the chickens from the belt of the third longitudinal conveyor assembly at essentially the third belt speed directly into a longitudinally aligned facing open compartment of the cage, (d)(4) relocating the third longitudinal conveyor belt assembly and discharging chickens into another facing open compartment in the cage, and (d)(5) repeating steps (d)(1)–(d)(4) until the cage is loaded with chickens; (e) with first cage 300A loaded with chickens, engaging cage 300A on tray 226 in the home position 290 with engager projections 273, 274 and operating cage mover 276 to move engaged cage 300A in the direction of the rear 253 of chassis 200B toward the place of destination 284, in so doing turning the front 227 of tray 226 towards the away position 291 and pivoting the base 308 under the back 306 of cage 300A on pivot member 275 to align cage 300A with its fork tubes 302 substantially parallel to the longitudinal centerline 210B of chassis 220B when the cage is at the rear portion or place of destination 284 with the doors 310 facing away from centerline 210B; (f) removing first cage 300A from support surface or deck; and (g) after operation "(b)" with respect to first cage 300A, placing a second cage 300B on the rear portion or place of origin 264, with second cage 300B fork tubes 310 longitudinally aligned substantially parallel to centerline 210B of chassis 200B and the doors 310 of the second cage 300B facing centerline 210B, and after commencing operation "(e)" with respect to first cage 300A, performing operations "(b)"–"(f)" on the second cage.

Referring to FIGS. 6A–6E, an alternative embodiment of a stager of this invention is described with reference in which cage deposit onto a towable stager apparatus is oriented with the cage doors to the left. The mirror reverse of this described embodiment is used for cage deposit onto a towable stager apparatus oriented with the cage doors to the right. The loading sequence for cages presented for filling is to be understood from the prior descriptions.

In the figures, reference numeral 400 indicates the stager apparatus of this invention, reference numerals 300A and 300B indicate cages staged on the stager 400 and reference numeral 10 indicates a schematic representation of the catcher and lifter described in detail above, which is used in conjunction with stage 400 to load cages 300A and 300B.

Stage 400 includes a towable body 411 on a frame 310 that suitably attaches axle pairs (not shown) each mounting wheels and tires (not shown) for tow of stager 400.

Stager 400 stages cages 300A and 300B for frontal filling of the cages. Stager 400 has a front 414, a rear 416, left and right sides 427 and 430 each longer than rear 416, and a centerline 432 (indicated by dashed line). A place of origin 434 is at a first rear portion of the stager to one side of the centerline 432 (the left side in the drawings). A place of destination 436 is at a second rear portion of stager 400 of the other side of the centerline 432 from place of origin 434 (the right side in the drawings). A first cage 300A is received on a support platform on stager 400 at the place of origin 434 with cage fork tubes 302A, 302B longitudinal to sides 427, 430 and cage doors 310 (shown open) facing a selected side of stager 400 (left side 427 in the figures). In the mirror reverse of this embodiment, right side 430 is the selected side.

A place of cage filling 438 is located at front 414 of stager 400 between sides 427 and 430. Means, suitably a cable or chain draw works acting on the support platform, are provided on stager 400, first, for moving a first cage 300A on the support platform from place of origin 434 to place of destination 436, thence to place of filling 438, in the course of movement from place of destination 436 to place of filling 438, drawing a semicircular slotted portion 442 of the support platform onto a pivot post 444 on stager 400 while drawing cage 300A to front 414, thereby rotating the support platform on pivot post 444, and therefore first cage 300A on the support platform, a quarter turn towards front 414. This pivoting rotation is clockwise in FIG. 6B, where the cage doors are oriented at place of origin 434 with the doors facing the left side, and would be counterclockwise in the mirror reverse embodiment where the cage doors are oriented at the place of origin with the doors facing the right side. The quarter turn during movement to front 414 positions first cage 300A in an orientation at place of filling 438 with doors 310 of cage 300A facing towards front 414 of stager 400.

The support platform is tilted up at the place of filling 438 with an elevator 234 as described in reference to the embodiments disclosed in FIG. 1C and is readied for filling.

The draw works provided on stager 400 also moves first cage 300A from place of filling 438 to place of destination 436, in the course of such movement pivoting the support platform at slot 442 in the opposite (counterclockwise) direction of pivot post 444, thus rotating first cage 300A a quarter turn towards the aforesaid selected side. Thus this is a counterclockwise quarter turn to left side 427 in FIG. 6D, and a clockwise quarter turn to right side 430 for the mirror reverse embodiment. This positions first cage 300A in an orientation at place of destination 436 with doors 310 of cage 300A facing towards the selected side (left side 427 in FIG. 6E, right side 430 in a mirror reverse embodiment).

The invention is practiced by placing empty first cage 300A on the platform at place of origin 434 to one side of the centerline 432 of stager 400 with the cage fork tubes 302A and 302B longitudinal to the sides 427, 430 of stager 400 and cage doors 310 facing out towards a selected side of the stager (the left side 427 in the drawings), then moving empty first cage 300A on the platform of stager 400 from place of origin 434 to place of destination 436 of stager 400 on the other side of the centerline 432. Next, empty first cage 300A is moved on stager 400 from place of destination 436 to place of filling 438 at the front 414 of stager 400 between sides 427, 430, in the course of movement of place of filling 438, rotating first stage 300A a quarter turn towards front 414, thereby to position first cage 300A in an orientation at the place of filling 438 with the doors 310 of cage 300A facing towards the front 414 of stager 400. Then at the place of filling 438 the compartments of the first cage 300A are filled with poultry inserted through the portals to the compartments given by opened front doors 310 of the compartments. The filling of the cages is performed using poultry batching and loading device 10 as described above.

After cage 300A is filled and doors 310 are closed, elevator 234 is then actuated to lower it and level cage 300A. Filled cage 300A on its platform is then moved from place of filling 438 to place of destination 437. In the course of this movement, filled first cage 300A is rotated a quarter turn towards the selected side 427, thereby to position filled first cage 300A in an orientation at place of destination 436 with closed doors 310 of cage 300A facing towards the selected side 427.

While first cage 300A is at place of filling 438, an empty second cage 300B is placed on a second platform on stager 300 at place of origin 434, with the fork tubes 302A and 302B of cage 300B longitudinal to the sides 427, 430 of stager 400. As so placed, doors 310 of second cage 300B face out towards the same selected side 427 of stager 400. First (not filled) cage 300A is removed (by forklift) from place of destination 436. The process described above is then carried out with second cage 300B, and another cage is placed on stager 400 at the place of origin 434 while cage 300B is being filled, and so on, until all the cages to be loaded are filled.

Thus in more compact terms the operation of the embodiment of FIGS. 6A–6E for loading chickens in a series of front-doored multi-compartmented chicken cages, comprises (a) placing a first of a series of empty said chicken cages on a platform having a front end and a longitudinal centerline, initially such that the cage is on one side of the centerline with the cage doors facing away from said centerline, thence (b) moving the cage on said platform to the opposite side of the centerline from where the empty cage was initially placed so that the doors of the cage face away from the centerline, thence (c) moving the cage to a front portion of the platform rotating the cage a quarter turn such that the cage is transverse to the centerline and the doors face the front of the platform, (d) receiving and conveying the chicken from ground level on a longitudinal revolving continuous belt to a higher elevation, (e) transferring the chickens to one or more serially generally longitudinally arranged revolving continuous belts including a terminal belt, (f) operating said belts to increase the speed of the chickens on the belts to a terminal speed in the range of 500 to 1400 feet per minute, (g) discharging the chickens at said terminal speed from a distal end of said terminal belt directly into a facing open compartment in said cage, (h) relocating the terminal belt and discharging chickens into another facing open compartment in said cage, (i) repeating steps (d)–(h) until the cage is loaded with chickens, (j) after the cage is loaded with chickens, moving the loaded cage on said platform to said opposite side of the centerline rotating the cage a quarter turn such that the doors of the cage face towards the centerline, (k) removing the first cage from the platform, (l) at anytime after operation (b), placing a second of said series of empty chicken cages on said platform, such that the second cage is on said one side of the centerline with the cage doors facing said away from said centerline, and then (m) repeating operations (b)–(k) with respect to said second cage.

I claim:

1. A method of loading chickens inside a chicken house into a chicken cage having a plurality of compartments, comprising:

a) receiving and conveying the chickens from ground level on a longitudinally revolving continuous belt to a higher elevation, b) transferring the chickens to one or more serially generally longitudinally arranged revolving continuous belts including a terminal belt, c) operating said belts to increase the speed of the chickens on the belts to a terminal speed in the range of 500 to 1400 feet per minute, and d) discharging the chickens at said terminal speed from a distal end of said terminal belt directly into a facing open compartment in said cage.

2. The method of claim 1 further comprising:

e) relocating the terminal belt and discharging chickens into another facing open compartment in said cage.

3. The method of claim 1 further comprising:

e) capturing chickens on the floor of the chicken house and ushering them onto said longitudinally revolving continuous belt to a higher elevation.

4. The method of claim 3 further comprising:

f) relocating the terminal belt and discharging chickens into another facing open compartment in said cage.

5. A method of loading chickens inside a chicken house into a chicken cage having a plurality of compartments, comprising:

a) receiving the chickens on a first longitudinal conveyor belt sloping upwardly from adjacent ground level to an elevated end and conveying the chickens on the first conveyor belt at a belt speed in the range of about 100 to about 400 feet per minute, b) receiving the chickens from said elevated end of said first longitudinal conveyor belt on a second longitudinal belt and conveying the chickens on said second longitudinal belt at a belt speed faster than the belt speed of said first longitudinal conveyor belt and in the range of about 200 to about 600 feet per minute, c) receiving the chickens from a distal end of said second longitudinal belt onto a third longitudinal conveyor belt longitudinally aligned with an open facing compartment of said cage and rotating said belt at a belt speed faster than the belt speed of said second longitudinal conveyor belt and in the range of about 500 to about 1400 feet per minute to discharge the chickens from a distal end of such third conveyor belt directly into said facing compartment.

6. The method of claim 5 further comprising:

d) relocating said third longitudinal conveyor belt and discharging chickens into another open facing compartment in said cage.

7. The method of claim 5 further comprising: d) capturing chickens on the floor of the chicken house and ushering them onto said first longitudinally revolving continuous belt to a higher elevation.

8. The method of claim 7 further comprising:

e) relocating said third longitudinal conveyor belt and discharging chickens into another open facing compartment in said cage.

9. A method for loading chickens inside a chicken house into a chicken cage having a plurality of compartments, comprising:

a) receiving chickens on a first longitudinal conveyor belt assembly comprising a frame, rollers and belt, said assembly sloping upwardly from adjacent ground level to an elevated end, and conveying the chickens on said belt thereof toward said elevated end at a first belt speed in the range of about 100 to about 400 feet per minute, b) receiving chickens from said elevated end of said first longitudinal conveyor belt essentially at said first belt speed onto a proximal end of a second longitudinal conveyor belt assembly comprising a frame, rollers and belt, and conveying the chickens on said belt of said second longitudinal conveyor assembly toward a distal end thereof at a second belt speed in the range of about 200 to about 600 feet per minute that is faster than said first belt speed, and c) receiving chickens from said distal end of said second longitudinal conveyor belt essentially at said second belt speed onto a proximal end of a third longitudinal conveyor belt assembly comprising a frame, rollers and belt, conveying the chickens on said belt of said longitudinal conveyor assembly toward said distal end thereof at a third belt speed in the range of 500 to about 1400 feet per minute that is faster than the second belt speed, and discharging said chickens from said belt of said third longitudinal conveyor assembly at essentially said third belt speed directly into a longitudinally aligned facing open compartment of said cage.

10. The method of claim 9 in which said third longitudinal conveyor belt assembly is mounted to said second longitudinal conveyor belt assembly to extend past the distal end of said second longitudinal conveyor belt assembly, and further comprising:

d) turning said frame of said second longitudinal conveyor assembly about a vertical axis of a first support for said frame of said second longitudinal conveyor assembly to move the distal end of the third longitudinal conveyor belt assembly horizontally in an arc centered on said vertical axis to a position in front of another compartment at the same elevation as the compartment into which chickens were discharged in step (c), and e) repeating operations (a)–(c).

11. The method of claim 9 in which said third longitudinal conveyor belt assembly is mounted to said second longitudinal conveyor belt assembly to extend past the distal end of said second longitudinal conveyor belt assembly, and further comprising:

d) turning said frame of said second longitudinal conveyor assembly about a horizontal axis of a second support for said frame of said second longitudinal conveyor assembly to move the distal end of the third longitudinal conveyor belt assembly vertically in an arc centered on said horizontal axis to a position in front of a compartment of said cage at an elevation different from the elevation of the compartment into which chickens were discharged in step (c), and e) repeating steps (a)–(c).

12. The method of claim 11 in which said cage is tilted such a compartments at a higher level are spaced from the distal end of said second longitudinal conveyor assembly more than compartments below them and in which said third longitudinal conveyor belt assembly is slideably mounted to said second longitudinal conveyor belt assembly for extension and retraction of said distal end of said third longitudinal conveyor belt assembly relative to said distal end of said second longitudinal conveyor belt assembly, and further comprising:

f) during or after step (b) but before step (e), extending or retracting said third conveyor belt assembly to locate the distal end of said third conveyor belt assembly immediately in front of said compartment at said different elevation.

13. The method of claim 9 in which said third longitudinal conveyor belt assembly is mounted to said second longitudinal conveyor belt assembly to extend past the distal end of said second longitudinal conveyor belt assembly, and further comprising, performing the following operations (d) and (e) in any order:

d) turning said frame of said second longitudinal conveyor assembly about a vertical axis of a first support for said frame of said second longitudinal conveyor assembly to move the distal end of the third longitudinal conveyor belt assembly horizontally in an arc centered on said vertical axis to a position in front of another compartment at the same elevation as the compartment into which chickens were discharged in step (c), e) turning said frame of said second longitudinal conveyor assembly about a vertical axis of a first support for said frame of said second longitudinal conveyor assembly to move the distal end of the third longitudinal conveyor belt assembly horizontally in an arc centered on said vertical axis to a position in front of another compartment at the same elevation as the compartment into which chickens were discharged in step (c), and f) repeating operations (a)–(c).

14. The method of claim 13 in which said cage is tiled such a compartments at a higher level are spaced from the distal end of said second longitudinal conveyor assembly more than compartments below them and in which said third longitudinal conveyor belt assembly is slideably mounted to said second longitudinal conveyor belt assembly for extension and retraction of said distal end of said third longitudinal conveyor belt assembly relative to said distal end of said second longitudinal conveyor belt assembly, and further comprising:

g) during or after step (d) or (e) but before step (f), extending or retracting said third conveyor belt assembly to locate the distal end of said third conveyor belt assembly immediately in front of said compartment in front of which said distal end of said third conveyor belt assembly is moved.

15. The method of claim 14 further comprising:

d) capturing chickens on the floor of the chicken house and ushering them onto said longitudinally revolving continuous belt to a higher elevation.

16. A method of loading chickens in a chicken house into a series of front-doored multi-compartmented chicken cages, comprising:

a) placing a first of a series of empty said poultry cages on a platform having a front end and a longitudinal centerline, initially such that the cage is on one side of the centerline with the cage doors facing said centerline, then b) moving the cage to a front portion of the platform transversely to the centerline with the doors facing the front of the platform, c) receiving and conveying the chickens from ground level on a longitudinally revolving continuous belt to a higher elevation, d) transferring the chickens to one or more serially generally longitudinally arranged revolving continuous belts including a terminal belt, e) operating said belts to increase the speed of the chickens on the belts to a terminal speed in the range of 500 to 1400 feet per minute, f) discharging the chickens at said terminal speed from a distal end of said terminal belt directly into a facing open compartment in said cage, g) relocating the terminal belt and discharging chickens into another facing open compartment in said cage, h) repeating operations (c)–(g) until the cage is loaded with chickens, i) after the cage is loaded with chickens, moving the loaded cage on said platform to the opposite side of the centerline from where the empty cage was initially placed so that the doors of the cage face away from the centerline, j) removing the first cage from the platform, k) at anytime after operation (b), placing a second of said series of empty chicken cages on said platform, such that the second cage is on said one side of the centerline with the cage doors facing said centerline, and then l) repeating operations (b)–(j) with respect to said second cage.

17. A method of loading chickens in a series of front-doored multi-compartmented chicken cages, comprising:

a) placing a first of a series of empty said chicken cages on a platform having a front end and a longitudinal centerline, initially such that the cage is on one side of the centerline with the cage doors facing away from said centerline, thence b) moving the cage on said platform to the opposite side of the centerline from where the empty cages was initially placed so that the doors of the cage face away from the centerline, thence c) moving the cage to a front portion of the platform rotating the cage a quarter turn such that the cage is transverse to the centerline and the doors face the front of the platform, d) receiving and conveying the chickens from ground level on a longitudinally revolving continuous belt to a higher elevation, e) transferring the chickens to one or more serially generally longitudinally arranged revolving continuous belts including a terminal belt, f) operating said belts to increase the speed of the chickens on the belts to a terminal speed in the range of 500 to 1400 feet per minute, g) discharging the chickens at said terminal speed from a distal end of said terminal belt directly into a facing open compartment in said cage, h) relocating the terminal belt and discharging chickens into another facing open compartment in said cage, i) repeating steps (d)–(h) until the cage is loaded with chickens, j) after the cage is loaded with chickens, moving the loaded cage on said platform to said opposite side of the centerline rotating the cage a quarter turn such that the doors of the cage face towards the centerline, k) removing the first cage from the platform, l) at anytime after operation (b), placing a second of said series of empty chicken cages on said platform, such that the second cages is on said one side of the centerline with the cage doors facing said away from said centerline, and then m) repeating operations (b)–(k) with respect to said second cage.

18. A method of loading chickens into a series of front-doored multi-compartmented multi-tier chicken cages having fork tubes extending along the front and back of the cage at the base of the cage transverse to the direction of front door opening, comprising:

a) placing a first said cage on one side of a longitudinal frame centerline in a rear portion of a support surface fixed on a frame having longitudinally connected front and rear ends, with said cage fork tubes longitudinally aligned substantially parallel to the longitudinal centerline of said frame and said cage doors facing the centerline, b) engaging said first cage placed on said rear portion and moving said engaged cage so aligned toward the front end of the frame and onto a tray in an away position of the tray, said tray being horizontally pivotally mounted on the same said one side of said centerline in a front portion of said frame and supported on said surface, said tray having a front end and a rear end and opposing sides and being pivotable from a home position in which the sides of the tray are transverse to the frame centerline, to said away position in which the sides of the tray are substantially parallel with the frame centerline, c) moving said tray to said home position where the cage doors face the front of the frame, d)
1) receiving chickens on a first longitudinal conveyor belt assembly comprising a frame, rollers and belt, said assembly sloping upwardly from adjacent ground level to an elevated end, and conveying the chickens on said belt thereof toward said elevated end at a first belt speed in the range of about 100 to about 400 feet per minute, 2) receiving chickens from said elevated end of said first longitudinal conveyor belt essentially at said first belt speed onto a proximal end of a second longitudinal conveyor belt assembly comprising a frame, rollers and belt, and conveying the chickens on said belt of said second longitudinal conveyor assembly toward a distal end thereof at a second belt speed in the range of about 200 to about 600 feet per minute that is faster than said first belt speed, 3) receiving chickens from said distal end of said second longitudinal conveyor belt essentially at said second belt speed onto a proximal end of a third longitudinal conveyor belt assembly comprising a frame, rollers and belt, conveying the chickens on said belt of said third longitudinal conveyor assembly toward said distal end thereof at a third belt speed in the range of 500 to about 1400 feet per minute that is faster than the second belt speed, and discharging said chickens from said belt of said third longitudinal conveyor assembly at essentially said third belt speed directly into a longitudinally aligned facing open compartment of said cage, 4) relocating said third longitudinal conveyor belt assembly and discharging chickens into another facing open compartment in said cage, 5) repeating steps (1)–(4) until the cage is loaded with chickens, e) after operations (a)–(c) and (d)(1)–(d)(5) are completed, engaging said first cage on said tray in said home position and moving said engaged cage in the direction of the rear of the frame on the opposite side of the centerline from said one side, in so doing turning the front of the tray away from said centerline to align said cage with its fork tubes substantially parallel to the longitudinal centerline of said frame when said cage is at said rear portion of the frame on said opposite side, and with the doors facing away form said centerline, f) removing said first cage from said support surface, and g) after operation (b) with respect to said first cage, placing a second said cage on said one side of the longitudinal frame centerline in said rear portion, with said second cage fork tubes longitudinally aligned substantially parallel to the longitudinal centerline of said frame and said doors of said second cage facing the centerline, and after commencing operation (e) with respect to said first cage, performing operations (b)–(f) on said second cage.

19. The method of claim 18 further comprising, after operation (c) and before operation (e), raising the front of the cage to incline the cage upwardly from the cage rear to the cage front at a predetermined minor acute angle, and after completion of operation (d)(5), lowering the front of the cage to horizontal.

20. A system for loading chickens into a series of a front-doored multi-compartmented multi-tier chicken cages having fork tubes extending along the front and back of the cage at the base of the cage transverse to the direction of front door opening, comprising:

a) a chicken loader comprising:
1) a vehicle comprising a chassis supported on a plurality of wheels powered by a power source contained on the vehicle for driving at least one wheel of the vehicle, said vehicle mounting a vertical post having an axis and supporting a bearing base coaxially disposed around said vertical post axis, 2) a first subframe rotationally supported on said bearing base for horizontal movement in an arc centered on said vertical post axis, 3) a first conveyor belt assembly comprising a frame, rollers and belt, said first conveyor belt frame having a proximal end and a distal end, said proximal end attaching to said first subframe, said distal end extending forwardly of the said vehicle and sloping downward from said proximal end to adjacent ground level for receiving chickens ushered onto the belt at the distal end from ground level of a chicken house, 4) a second subframe rotationally supported by said vertical post for horizontal movement in an arc centered on said vertical post axis, said second subframe including a member projecting rearwardly of said vehicle and having a distal end, 5) a second conveyor belt assembly comprising a second frame, rollers and belt, said second conveyor belt frame having a proximal end and a distal end, said proximate end of said frame pivotingly attaching to said second subframe on a horizontal axis member supported on said second subframe forwardly of said rearwardly projecting member, said proximal end of said second conveyor belt frame being disposed relative to the proximal end of the first conveyor frame for effective transfer of chickens from said first conveyor belt to said second conveyor belt, 6) a second prime mover connected at one end thereof to said distal end of said rearwardly projecting member and at the other end thereof to said second conveyor belt frame, for raising or lowering said distal end of the second conveyor belt frame in an arc about such horizontal axis, 7) a third conveyor belt assembly comprising a third frame, rollers and belt, said third conveyor belt frame having a proximal end and a distal end and being in longitudinally alignment with and longitudinally slideably mounted on said second conveyor belt frame, 8) a third prime mover connected at one end thereof to said second conveyor belt frame and at the other end thereof to said third conveyor belt frame, for slidingly extending and retracting said third conveyor belt frame on said second conveyor belt frame, 9) a driver operatively coupled to one of said first conveyor belt frame rollers for driving the first conveyor belt in the direction of said proximal end thereof at a at first belt speed in the range of about 100 to about 400 feet per minute, 10) a driver operatively coupled to one of said second conveyor belt frame rollers for driving the second conveyor belt in the direction of said distal end thereof at a second belt speed in the range of about 200 to about 600 feet per minute that is faster than said first belt speed, and 11) a driver operatively coupled to one of said third conveyor belt frame rollers for driving the first conveyor belt in the direction of said distal end thereof at a third belt speed in the range of 500 to about 1400 feet per minute that is faster than the second belt speed, b) a leading chassis including:

1) a leading distance frame having a longitudinal centerline and longitudinally connected front and rear ends, said leading chassis frame mounting transversely to said longitudinal centerline at least one wheel axle carrying wheels supporting the leading chassis frame above ground level, 2) aligning and connecting members at the rear of the leading chassis frame for aligning and connecting the leading chassis to a trailing chassis, 3) a rear platform on the rear of said leading chassis frame rear, 4) a tray horizontally pivotally mounted and supported on said rear platform on one side of centerline, said tray having a front end and a rear end and opposing side and being pivotable from a home position in which the sides of the tray are transverse to the centerline of the leading chassis frame, to an away position in which the sides of the tray are longitudinal to the centerline of the leading chassis frame, 5) an elevator attached to said leading chassis frame adjacent the front end of such frame and elevatable above said rear platform, 6) said sides of said tray being an in-side and an out-side, said in-side being closer to said leading chassis centerline than the out-side when the tray is in the away position, said in-side having an opening through which said elevator can elevate above said tray when the tray is in the home position, said out-side comprising an upstanding retainer member, 7) a first leading chassis subframe with connected front and rear ends mounted on said leading chassis frame between said leading chassis frame front end and said platform at an angle inclining the front end of the first subframe above said leading chassis frame at selected angle to the leading chassis frame, 8) a second leading chassis subframe, 9) a lift assembly connected to said first and second leading chassis subframes for lifting or lowering said second leading chassis subframe relative to said first leading chassis subframe such the angle of the second leading chassis subframe is maintained at the angle of the first leading chassis subframe throughout the course of lifting or lowering, c) said trailing chassis comprising:

1) a trailing chassis frame having a longitudinal centerline and longitudinally connected front and rear ends, the front end having mating members for said aligning and connecting members for connecting the trailing chassis in longitudinal alignment with said leading chassis, said trailing chassis frame transversely mounting at least one axle for carrying wheels, the wheels supporting the trailing chassis frame above ground level substantially at the same elevation as the level of the leading chassis, 2) a supporting surface mounted on said trailing chassis frame, 3) a first cage mover supported by said trailing chassis frame in a rear portion of said trailing chassis on the same side of the trailing chassis centerline where said tray on said leading chassis is in said away position, said first cage mover having a first engager for engaging a said chicken cage placed on said rear portion of said trailing chassis with said cage fork tubes longitudinally aligned substantially parallel to said trailing chassis centerline and said cage doors facing said centerline, and having a first force transmission movement carrying said first engager for moving said engaged cage so aligned toward the front end of the trailing chassis and onto said tray in said away position, and 4) a second cage mover on said trailing chassis on the side of said trailing chassis centerline opposite said first cage mover, said second cage mover having an second cage engager for engaging said cage on said tray when said tray is in said home position and a second force transmission movement carrying said second engager for moving said engaged cage towards a rear portion of the trailing chassis frame on said opposite side of the centerline, in so doing turning the front of the tray towards the away position to align said cage with its fork tubes substantially parallel to the longitudinal centerline of said trailing chassis when said cage is at said rear portion of the trailing chassis frame on said opposite side, and with the doors facing away from said centerline.

21. The system of claim 20 in which said first force transmission drive comprises one or more flexible members of a loop carried on rotating supports for travel in a forward direction toward the front of said trailing chassis above said surface and for travel in a reverse direction toward the rear of said trailing chassis under said surface.

22. The system of claim 21 in which said flexible members of a loop comprise a pair of chains.

23. The chassis system of claim 22 in which said engager is a pair of projections carried by each of the chains at the same points along the length of the chains of height adapted to press against the base of a said chicken cage placed on said rear portion of said trailing chassis with said cage fork tubes longitudinally aligned substantially parallel to said trailing chassis centerline when said projections are above said surface.

24. The chassis system of claim 20 in which said second force transmission drive comprises a flexible member of a loop carried on rotating supports for travel in a forward direction toward the front of said trailing chassis above said surface and for travel in a reverse direction toward the rear of said trailing chassis under said surface.

25. The chassis system of claim 24 in which said flexible member of a loop comprises a chain.

26. The chassis system of claim 25 in which said engager is a projection carried by said chain and adapted to press against a base of said chicken cage when said projection is above said surface.

* * * * *